United States Patent [19]

Suzuki

[11] Patent Number: 5,907,499
[45] Date of Patent: May 25, 1999

[54] HARDWARE IMPLEMENTED DIVIDER FOR BINARY NUMBERS USING A REDUNDANT BINARY REPRESENTATION

[75] Inventor: Hiroaki Suzuki, Tokyo, Japan

[73] Assignee: Mitsubishi Denki Kabushiki Kaisha, Tokyo, Japan

[21] Appl. No.: 08/821,777

[22] Filed: Mar. 20, 1997

[30] Foreign Application Priority Data

Nov. 1, 1996 [JP] Japan .................................. 8-291943

[51] Int. Cl.⁶ ...................................................... G06F 7/52
[52] U.S. Cl. ............................................................. 364/764
[58] Field of Search ...................................... 364/758–762, 364/748.1, 748.16, 751, 766, 754.01, 763–765, 767

[56] References Cited

U.S. PATENT DOCUMENTS 5,206,827   4/1993   Tsuruta ...................................... 364/767
5,473,559  12/1995   Makino ..................................... 364/758

FOREIGN PATENT DOCUMENTS 63-182740   7/1988   Japan .
 7-261982  10/1995   Japan .

OTHER PUBLICATIONS

N. Takagi et al., "A VLSI–Oriented High–Speed Divider Using Redundant Binary Representation," *The Journal D of the Institute of Electronics, Information and Communication Engineers of Japan*, 84/4, vol. J67–D, No. 4, pp. 450–457.

T. Taniguchi et al., "High–Speed Multiplier and Divider Using Redundant Binary Representation," *Technical Report ED88–48 of the Institute of Electronics, Information and Communication Engineers of Japan*, pp. 1–6.

*Primary Examiner*—Emmanuel L. Moise
*Attorney, Agent, or Firm*—Burns, Doane, Swecker & Mathis, LLP

[57] ABSTRACT

A divider including a quotient decision circuit for making a sign decision of a quotient bit from upper three bits of a partial remainder, a redundant binary adder for adding a divisor to the partial remainder, a redundant binary subtractor for subtracting the divisor from the partial remainder, and a selector for selecting one of the output of the redundant binary adder, the partial remainder, and the output of the redundant binary subtractor. All these circuits use redundant binary numbers in which a set of values (−1, 0, 1) taken by each digit of the redundant binary number is represented by (01, 00, 10). This makes it possible to solve a problem of conventional dividers in that the conversion of a redundant binary number was necessary before the quotient decision because the partial remainder computing section and the quotient decision section of the conventional dividers employed redundant binary numbers whose bit arrangements differ from each other, which hinders the conventional dividers from achieving fast division.

13 Claims, 17 Drawing Sheets

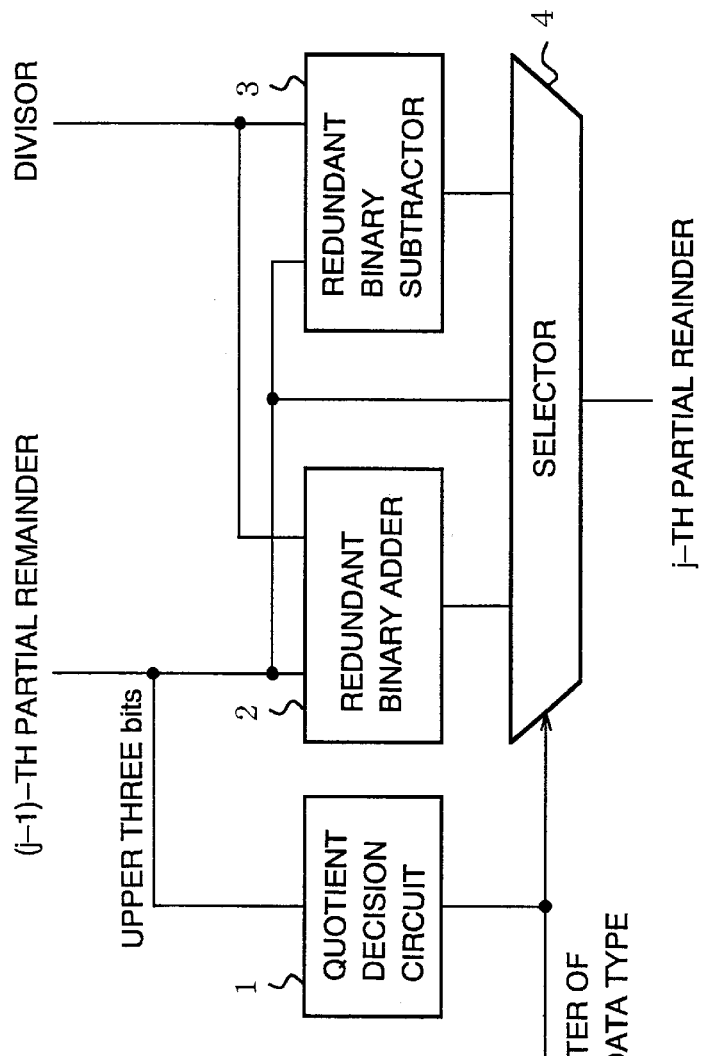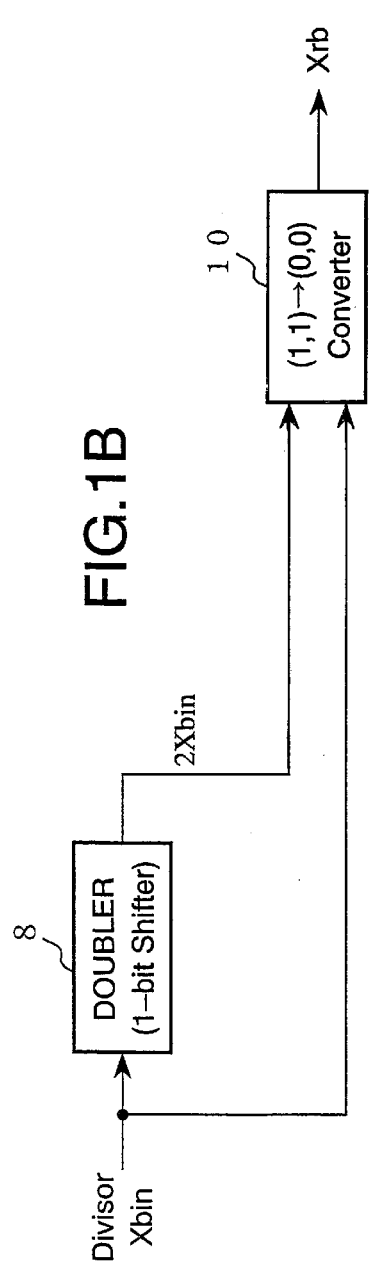
FIG.1A
FIG.1B

HARDWARE IMPLEMENTED DIVIDER FOR BINARY NUMBERS USING A REDUNDANT BINARY REPRESENTATION

BACKGROUND OF THE INVENTION

1. Field of the Invention

The present invention relates to a divider carrying out division of binary numbers by means of hardware.

2. Description of Related Art

Division is achieved by sequential processing algorithm which iterates multiplication and decision of a result. Although various special hardware systems are proposed for shrinking processing time, they still demand much greater time than multiplication or addition, and hence a faster divider is desired. We will explain division algorithm below, in which X designates a dividend, Y designates a divisor, $R^i$ designates an i-th partial remainder, Q designates a quotient, $q_i$ designates an i-th digit of the quotient, Z designates a quotient converted into a binary number, and $r^i1$, $r^i0$, and $r^i-1$ designates upper three bits of the i-th partial remainder $R^i$.

Division Algorithm

Step 1
$\quad R^0 \leftarrow X$, dividend $(1 \leq X < 2)$
$\quad D \leftarrow Y$, divisor $(1 \leq Y < 2)$ Step 2
$\quad q_0 := 1$, the most significant digit of a quotient
$\quad R^1 := R^0 - D$, partial remainder (redundant binary number)

Step 3
$\quad$ for i=1 until n do
$\quad\quad$ begin
$\quad\quad\quad$ if $[r^i1\ r^i0.\ r^i-1] < 0 \quad q_i := -1$
$\quad\quad\quad$ if $[r^i1\ r^i0.\ r^i-1] = 0 \quad q_i := 0$
$\quad\quad\quad$ if $[r^i1\ r^i0.\ r^i-1] > 0 \quad q_i := 1$
$\quad\quad\quad R^{i+1} := 2 \times R^i - q_i \times D$
$\quad\quad$ end Step 4
$\quad Q := [q_0.q_1 q_2 \cdots q_n]$
$\quad Z \leftarrow Q$, convert to a binary number $(1/2 < Z < 2)$ First, at step 1, the dividend X and the divisor Y are input which are normalized such that $1 \leq X < 2$ and $1 \leq Y < 2$. At step 2, the partial remainder $R^1$ represented in a redundant binary number is obtained by setting to one the most significant digit $q_0$ of the quotient Q. The partial remainder $R^1$ can be obtained by subtracting the divisor Y from the dividend X. Since both the dividend X and divisor Y are a binary number here, the partial remainder $R^1$ represented in the redundant binary number can be obtained by subtraction of respective digits without a carry. At step 3, upper three bits $[r^i1\ r^i0.\ r^i-1]$ of the generated partial remainder $R^i$ undergo successive decision whether they are negative, zero or positive for i=1, 2, . . . , n, so that the quotient $q_i$ is obtained by the number of digits required. Finally, at step 4, the quotient Q represented in the redundant binary number is converted into the quotient Z represented in the binary number, thus ending the processing.

FIG. 15 is a block diagram showing the divisor in its entirety using the redundant binary representation based on the foregoing division algorithm, which is disclosed, for example, in "A VLSI-Oriented High-Speed Divider Using Redundant Binary Representation", by Naofumi TAKAGI, Hiroto YASUURA, and Shuzo YAJIMA, The Journal D of the Institute of Electronics, Information and Communication Engineers of Japan, 84/4, Vol.J67-D, No. 4, pp.450–457. The divider is implemented by employing ECL (Emitter Coupled Logic) as its internal circuit. In FIG. 15, a double square designates a cell for deciding a quotient, and a single square designates a cell for carrying out redundant binary addition and subtraction. Each row of cells designated by the single squares forms a redundant binary adder and subtractor for the redundant binary addition and subtraction, and each row of cells consisting of the redundant binary adder and subtractor plus the single cell for making quotient decision designated by the double square carries out computation for one loop of step 3 in the foregoing division algorithm.

FIGS. 16 and 17 are block diagrams showing a quotient decision circuit and partial remainder generation and addition circuit constituting the divider using the redundant binary representation based on the foregoing division algorithm, which is disclosed, for example, in "High-Speed Multiplier and Divider using Redundant Binary Representation", by Takashi TANIGUCHI, Hisakazu EDAMATSU, Tamotsu NISHIYAMA, Shigeo KUNINOBU and Naofumi TAKAGI, Technical Research Report ED88-48 of the Institute of Electronics, Information and Communication Engineers of Japan. The quotient decision circuit and the partial remainder generation and addition circuit are implemented using a CMOS (Complementary Metal-Oxide Semiconductor) circuit.

The quotient decision circuit as shown in FIG. 16 makes a decision of the quotient $q_i$ from the upper three bits of the partial remainder $R^i$ as shown in step 3 of the foregoing division algorithm. The redundant binary representation of the upper three bits of the partial remainder $R^i$ and the quotient $q_i$ represents $(1, 0, -1)$ by $(10, 00, 01)$ using a pair of signals $\{z_{ip}, z_{in}\}$, so that the decision is easily made whether the value is positive or negative. This simplifies the configuration of the quotient decision circuit.

The partial remainder generation and addition circuit as shown in FIG. 17 is used for computing the partial remainder $R^{i+1}$ at step 3 of the foregoing division algorithm. It is necessary for the generation of the partial remainder $R^{i+1}$ at step 3 to subtract the product of the quotient $q_i$ and the divisor D from the partial remainder consisting of a redundant binary number which is shifted to the left by one digit. However, since the divisor D is a binary number, it is only necessary to consider computation between the redundant binary number and the binary number. Thus, the adder is arranged such that it adds the divisor D when the i-th digit $q_i$ of the quotient Q is $-1$, adds zero when $q_i$ is zero, and adds the two's complement of the divisor D when $q_i$ is one. In this way, only the addition of the redundant binary number and the binary number is required, which simplifies the configuration of the partial remainder generation and addition circuit because the carry is always non-negative. The partial remainder generation and addition circuit, however, uses a redundant binary representation different from that of the quotient decision circuit, where $(1, 0, -1)$ is represented as $(11, 10, 01)$ using a pair of signals $\{z_{is}, z_{ia}\}$.

Arraying the quotient decision circuits and the partial remainder generation and addition circuits thus arranged makes it possible to construct a divider with a regular cell arrangement, in which the quotient decision circuits as shown in FIG. 16 are placed as the quotient decision cells designated by the double squares in FIG. 15, and the partial remainder generation and addition circuits as shown in FIG. 17 are placed as the redundant binary addition and subtraction circuits designated by the single squares. The conversion of the quotient into a binary number by a redundant binary-to-binary converter can be carried out by subtracting the binary number consisting of $q_{iN}$ from the binary number consisting of $q_{i,P}$, which are output from the respective quotient decision circuits.

Thus, the conventional divider uses different redundant binary representations in the quotient decision circuit as shown in FIG. 16 and the partial remainder generation and addition circuit as shown in FIG. 17. Accordingly, it is necessary to unify the redundant binary representations by inserting a converter between the two circuits.

FIG. 18 is a block diagram showing an example of such a converter which converts a redundant binary number in which (1, 0, −1) is represented by (11, 10, 01) into a redundant binary number in which (1, 0, −1) is represented by (10, 00, 01). More specifically, when (1, 1) representing +1 is input as $z_{is}$ and $z_{ia}$, it is converted into $z_{ip}$ and $z_{in}$ of (1, 0), and its inverted signal (0, 1) is output. Likewise, when (1, 0) representing zero is input, it is converted to (0, 0) and its inverted signal (1, 1) is output, and when (0, 1) representing −1 is input, it is converted to (0, 1) and its inverted signal (1, 0) is output.

FIG. 19 is a block diagram showing a quotient decision circuit, to which such converters are added to its input. The upper three bits $[r^i1 \ r^i2 \ r^i-1]$ of the partial remainder $R^i$ generated by the respective partial remainder generator and addition circuits are converted by the converters from the redundant binary number in which (1, 0, −1) is represented as (11, 10, 01) to the redundant binary number in which (1, 0, −1) is represented as (10, 00, 01).

In the conventional divider with such a configuration, the conversion is needed before making a quotient decision because the subtraction cells (partial remainder generator and addition circuits) for computing the partial remainders and the quotient decision cells for making the quotient decision (quotient decision circuits) use different redundant binary representations. This presents a problem in that the converter is essential, which complicates the configuration of the divider, and hinders the processing time of the division from being reduced owing to the delay of the conversion.

SUMMARY OF THE INVENTION

The present invention is achieved to solve such a problem, thereby providing a divider that can perform faster division processing using the redundant binary numbers.

According to a first aspect of the present invention, there is provided a divider comprising:

a quotient decision circuit for making a sign decision of a quotient bit from upper three bits of a (j−1)-th partial remainder represented by a redundant binary number, the redundant binary number representing its −1 by (0, 1), 0 by (0, 0) and 1 by (1, 0);

a redundant binary adder for adding a divisor represented by the redundant binary number to the (j−1)-th partial remainder represented by the redundant binary number;

a redundant binary subtractor for subtracting the divisor represented by the redundant binary number from the (j−1)-th partial remainder represented by the redundant binary number; and a selector for selecting, in response to a decision result of the quotient decision circuit, one of an output of the redundant binary adder, the (j−1)-th partial remainder, and an output of the redundant binary subtractor, and for outputting a selected signal as a j-th partial remainder represented by the redundant binary number.

Here, the divider may further comprise means for converting a bit pair (1, 1) into a bit pair (0, 0) when converting the divisor into a redundant binary number.

The quotient decision circuit may comprise first and second zero decision means for making a zero decision of most significant and second significant redundant binary digits of the (j−1)-th partial remainder, respectively; and selector means, controlled by the results of the zero decision, for selecting one of the upper three bits of the partial remainder, from which the sign of the quotient is known, and for outputting the selected one as a decision result.

The quotient decision circuit may further comprise third zero decision means for making zero decision of a third significant redundant binary digit of the partial remainder, and may output a decision signal indicating that upper three digits of the partial remainder are all zero in response to the logical value of the output of the third zero decision means and the logical values of the outputs of the first and second zero decision means.

The redundant binary adder may comprise first logical means for generating a pair of signals, one of which indicates a logical AND of inverted values $e_i^+L$ and $e_i^-L$ of a redundant binary bit of the divisor, and the other of which indicates an inverted value of the logical AND of the inverted values $e_i^+L$ and $e_i^-L$; second logical means for generating a pair of signals, one of which indicates a logical AND of inverted values $f_i^+L$ and $f_i^-L$ of a redundant binary bit of the partial remainder, and the other of which indicates an inverted value of the logical AND of the inverted values $f_i^+L$ and $f_i^-L$; third logical means for generating a signal based on the inverted value $e_i^+L$ of the redundant binary bit of the divisor and the inverted value $f_i^+L$ of the redundant binary bit of the partial remainder; fourth logical means for generating a pair of signals $l_iL$ and $l_iH$, one of which indicates a logical AND of the inverted value $e_i^-L$ of the redundant binary bit of the divisor and the inverted value $f_i^-L$ of the redundant binary bit of the partial remainder, and the other of which indicates an inverted value of the logical AND of the inverted values $e_i^-L$ and $f_i^-L$, and for sending the pair of signals $l_iL$ and $l_iH$ to the next stage; first gate means for generating a signal $r_iH$ and its complementary signal $r_iL$ from the output of the first logical means in response to the output of the second logical means; second gate means for generating signals $l_{i-1}L$ and $l_{i-1}H$ fed from the fourth logical means of a previous stage without change or with their positions being exchanged in response to the signals $r_iH$ and $r_iL$ output from the first gate means; third gate means for generating a pair of signals $\beta_iH$ and $\beta_iL$ which are complementary to each other from an output of the third logical means and the signals $l_{i-1}L$ and $l_{i-1}H$ fed from the fourth logical means of the previous stage in response to the signals $r_iH$ and $r_iL$ output from the first gate means, and for supplying the pair of signals $\beta_iH$ and $\beta_iL$ to the next stage; and fifth logical means for generating inverted values $h_i^+L$ and $h_i^-L$ of a redundant binary bit of an addition output of the redundant binary adder from an output of the second gate means and signals $\beta_{i-1}H$ and $\beta_{i-1}L$ fed from the third gate means of the previous stage.

The first gate means of the redundant binary adder may select one of the complementary signals output from the second logical means in response to the output of the first logical means, and produces the selected signal as the signal $r_iH$, and its inverted signal as the signal $r_iL$; the second gate means may select one of the pair of signals $l_{i-1}L$ and $l_{i-1}H$ fed from the fourth means of the previous stage in response to the signals $r_iH$ and $r_iL$ output from the first gate means, and produces the selected signal and its inverted signal; and the third gate means may select one of the signal $l_{i-1}H$ fed from the fourth logical means of the previous stage and the signal output from the third logical means in response to the signals $r_iH$ and $r_iL$ output from the first gate means, and produces the selected signal and its inverted signal as the signals $\beta_iH$ and $\beta_iL$.

The first and second gate means may each exchange the output positions of the input signals which are complementary to each other; the third logical means may generates a pair of signals which are complementary to each other; and the third gate means may select one of two pairs of signals consisting of the pair of signals output from the third logical means and the pair of signals $l_{i-1}L$ and $l_{i-1}H$ fed from the fourth logical means of the previous stage, and may produce the selected pair of signals as the signals $\beta_iH$ and $\beta_iL$.

The first to third gate means may each comprise transmission gates.

The redundant binary adder and the redundant binary subtractor may be integrated into one redundant binary adder and subtractor which comprises, in addition to the redundant binary adder, eighth logical means for inputting the inverted value $e_i^-L$ of the redundant binary bit of the divisor and the inverted value $f_i^+L$ of the redundant binary bit of the partial remainder; ninth logical means for generating a pair of signals $ls_iL$ and $ls_iH$ indicating a logical AND of the inverted value $e_i^+L$ of the redundant binary bit of the divisor and the inverted value $f_i^-L$ of the redundant binary bit of the partial remainder, and an inverted value of the logical AND; fourth gate means for generating signals $ls_{i-1}L$ and $ls_{i-1}H$ fed from the ninth logical means of the previous stage without change or with their output positions being exchanged in response to the signals $r_iH$ and $r_iL$ output from the first gate means; fifth gate means for generating a pair of signals $\beta s_iH$ and $\beta s_iL$ which are complementary to each other from an output of the eighth logical means and the signals $ls_{i-1}L$ and $ls_{i-1}H$ fed from the ninth logical means of the previous stage in response to the signals $r_iH$ and $r_iL$ output from the first gate means, and for supplying the pair of signals $\beta s_iH$ and $\beta s_iL$ to the next stage; and tenth logical means for generating inverted values $hs_i^+L$ and $hs_i^-L$ of a redundant binary bit of a subtraction output, from an output of the fourth gate means and signals $\beta s_{i-1}H$ and $\beta s_{i-1}L$ fed from the fifth gate means of the previous stage.

The third logical means and the eighth logical means of the redundant binary adder and subtractor may each generate a pair of signals which are complementary to each other; the first, second and fourth gate means may each comprise transmission gates for outputting a pair of signals input thereto with their output positions being exchanged; the third gate means may comprise transmission gates for selecting one of two pairs of signals consisting of a pair of the signals $la_{i-1}L$ and $la_{i-1}H$ fed from the previous stage and a pair of the signals output from the third logical means, and the fifth gate means may comprise transmission gates for selecting one of two pairs of signals consisting of a pair of the signals $ls_{i-1}L$ and $ls_{i-1}H$ fed from the previous stage and a pair of signals output from the eighth logical means.

According to a second aspect of the present invention, the redundant binary adder and the redundant binary subtractor are replaced by a redundant binary adder with a function of switching an operation mode between an addition operation mode and a subtraction operation mode in response to a control signal fed from the quotient decision circuit.

The redundant binary adder with the function of switching the operation mode may comprise a redundant binary adder; and a signal path exchanger for exchanging positions of one of two bit pairs input to the redundant binary adder in response to the control signal from the quotient decision circuit.

The redundant binary adder with the function of switching the operation mode may comprise third and eleventh logical means for generating signals $ka_iL$ and $la_iL$ used for addition from the inverted signals of the redundant binary bit of the divisor and the partial remainder; eighth and twelfth logical means for generating signals $ks_iL$ and $ls_iL$ used for subtraction by inputting one of the inverted signals of the redundant binary bit of the divisor and that of the partial remainder such that their input positions are exchanged from those input to the third and eleventh logical means; and signal path selecting means for selecting one of the signals $ka_iL$ and $ks_iL$ to input the selected one to the third gate means, and for selecting and one of the signals $la_iL$ and $ls_iL$ to send the selected one to the next stage together with its inverted signal.

BRIEF DESCRIPTION OF THE DRAWINGS

FIG. 1A is a block diagram showing a major portion of an embodiment 1 of a divider in accordance with the present invention;

FIG. 1B is a block diagram showing a converter for converting a divisor represented in the binary number into one represented in a redundant binary number;

DETAILED DESCRIPTION OF THE PREFERRED EMBODIMENTS

Figure 2:
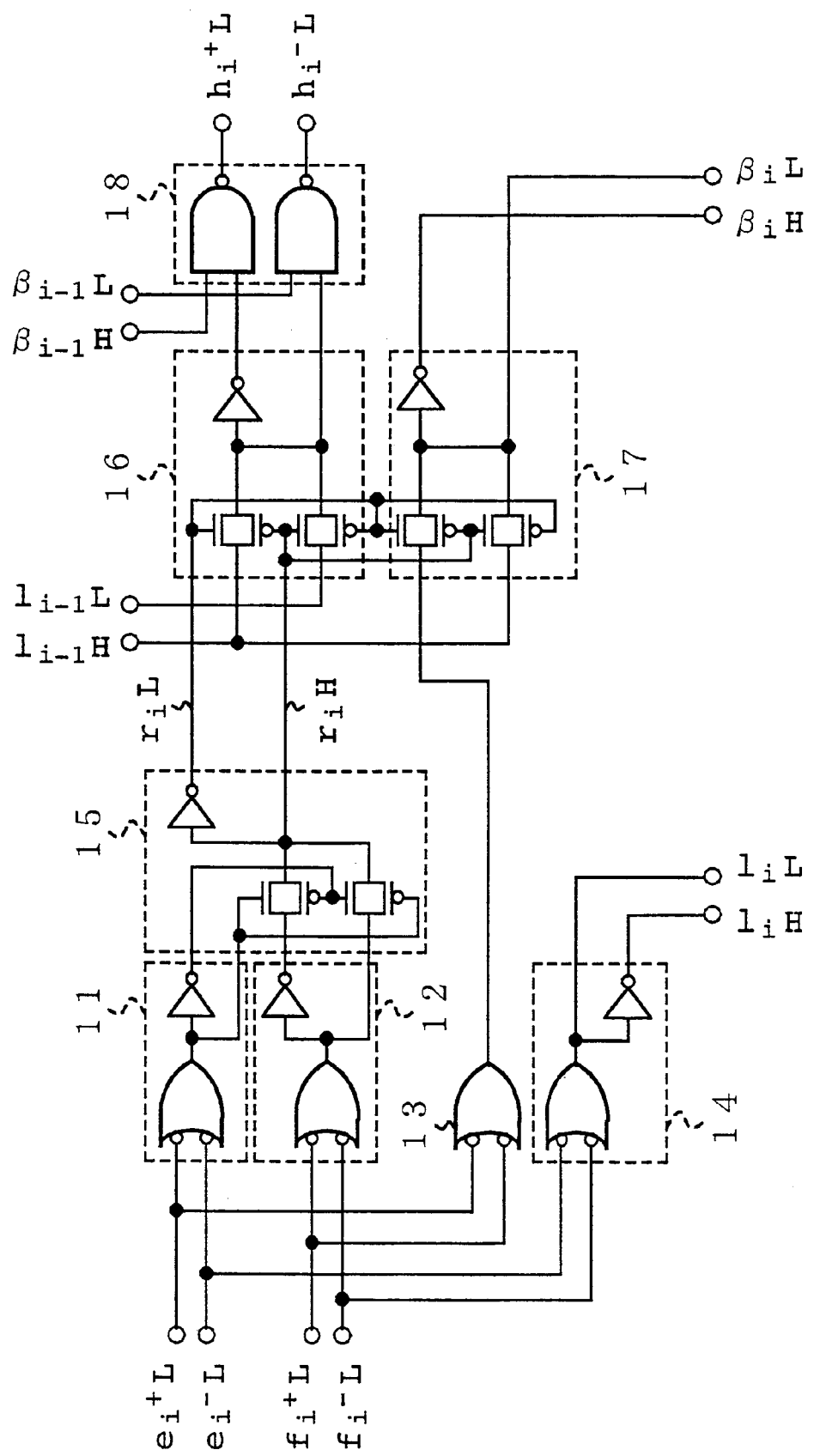
FIG. 2 is a circuit diagram showing a configuration for one bit of a redundant binary adder in the embodiment 1.

The invention will now be described with reference to the accompanying drawings.

EMBODIMENT 1

FIG. 1A is a block diagram showing a major portion of an embodiment 1 of a divider in accordance with the present invention, which shows a configuration of a j-th row of a redundant binary divider array. In this figure, the reference numeral 1 designates a quotient decision circuit for making a decision of the sign of a quotient bit of the (j−1)-th partial remainder from its upper three bits, where the partial remainder is represented in ternary redundant binary number in which −1 is represented by (0, 1), 0 is represented by (0, 0) and +1 is represented by (1, 0). An initial value of the (j−1)-th partial remainder is usually a dividend of a binary number. The reference numeral 2 designates a redundant binary adder for adding a divisor represented in the redundant binary number to the (j−1)-th partial remainder represented in the redundant binary number; and 3 designates a redundant binary subtractor for subtracting the divisor represented in the redundant binary number from the (j−1)-th partial remainder represented in the redundant binary number. The reference numeral 4 designates a selector for selecting one of the output of the redundant binary adder 2, the (j−1)-th partial remainder input to the selector and the output of the redundant binary subtractor 3 in response to the output of the quotient decision circuit 1.

Next, the operation will be described.

Computations are carried out for obtaining the j-th partial remainder. More specifically, addition of the divisor to the (j−1)-th partial remainder, subtraction of the divisor from the (j−1)-th partial remainder, and generation of a selecting signal from the (j−1)-th partial remainder, that is, the sign decision by the quotient decision circuit 1 are carried out in parallel, and one of the output of the redundant binary adder 2, the output of the redundant binary subtractor 3 and the (j−1)-th partial remainder is produced from the selector 4 driven by the control signal generated by the quotient decision circuit 1. The output of the quotient decision circuit 1 is not only used as the selecting signal of the selector 4, but also supplied to a data converter (not shown in the drawings) of the quotient to be converted to a binary number, and output as the quotient. The j-th partial remainder selected and output from the selector 4 is processed likewise by a (j+1)-th redundant binary divider array having the same configuration as that of FIG. 1A.

The redundant binary numbers used in the present invention are defined as a number formed by subtracting a pair of digits, where −1 is represented by (0, 1), 0 is represented by (0, 0) and +1 is represented by (1, 0), thereby having a ternary redundant binary representation. The present invention is characterized in that it uses the redundant binary numbers of this form throughout the entire internal computations of the divider consistently. The dividend has been converted into the redundant binary number after the computation of the first partial remainder, but the divisor must be converted before starting the computation. Since a number X can be expressed as X=2X−X, the divisor can be converted into the redundant binary number by representing it in the form of 2X−X. In addition, since the binary number doubles when shifted to the left by one bit, each bit of the divisor Xrb represented in the redundant binary number is formed by a bit pair of the divisor Xbin represented in the ordinary binary number and the Xbin shifted to the left by one bit, that is, 2Xbin.

FIG. 1B is a block diagram showing a converter for converting the divisor Xbin represented in the ordinary binary number into the divisor Xrb represented in the redundant binary number. The divisor Xbin is input to a doubler (one-bit shifter) 8 to generate 2Xbin. The divisor Xbin and the 2Xbin are input to a converter 10 which computes 2Xbin−Xbin=Xrb for each digits thereof. When the bit pair of the Xrb becomes (1, 1), the converter 10 converts it into (0, 0). Since this conversion is carried out only once at the first one of the iterative divisions, an increase in the delay of the divider due to the conversion is very small. In addition, since the doubler 8 can be implemented by only changing connection, no additional circuit is actually required for implementing the doubler 8.

FIG. 2 is a circuit diagram showing a configuration for one bit of the redundant binary adder 2 used for computing the partial remainder. In this figure, the reference numeral 11 designates a first logical means for generating a pair of signals, one of which represents the logical AND of the inverted values $e_i^{+}L$ and $e_i^{-}L$ of a redundant binary bit of the divisor, and the other of which represents the inverted value of the logical AND. The reference numeral 12 designates a second logical means for generating a pair of signals, one of which represents the logical AND of the inverted values $f_i^{-}L$ and $f_i^{-}L$ of a redundant binary bit of the partial remainder, and the other of which represents the inverted value of the logical AND. The reference numeral 13 designates a third logical means for generating a signal representing a logical NAND of the redundant binary bit $e_i^{+}L$ of the divisor and the redundant binary bit $f_i^{+}L$ of the partial remainder, and 14 designates a fourth logical means for generating a pair of signals $l_iL$ and $l_iH$ where $l_iH$ represents the logical AND of the redundant binary bit $e_i^{-}L$ of the divisor and the redundant binary bit $f_i^{-}L$ of the partial remainder, and $l_iL$ represents the inverted value of $l_iH$. The reference numeral 15 designates a first gate means which includes two CMOS transmission gates for selecting one of a pair of signals output from the second logical means 12 in response to the output of the first logical means 11, and which generates a pair of complementary signals $r_iH$ and $r_iL$ representing non-complementary and complementary signals of the selected signal.

The reference numeral 16 designates a second gate means which includes two CMOS transmission gates for selecting one of the pair of complementary signals $l_{i-1}L$ and $l_{i-1}H$ sent from the fourth logical means 14 of the previous stage (i−1)-th bit in response to the outputs $r_iH$ and $r_iL$ of the first gate means 15, and which generates a pair of complementary signals representing non-complementary and complementary signals of the selected signal. The reference numeral 17 designates a third gate means which includes two CMOS transmission gates for selecting one of the output of the third logical means 13 and the signal $l_{i-1}H$ sent from the fourth logical means 14 of the previous stage in response to the outputs $r_iH$ and $r_iL$ of the first gate means 15, and which generates a pair of signals $\beta_iH$ and $\beta_iL$ which are complementary to each other, and represent non-complementary and complementary signals of the selected signal. The reference numeral 18 designates a fifth logical means for producing the logical NAND of the signal $\beta_{i-1}H$ sent from the third gate means 17 in the previous stage and the complementary output signal of the second gate means 16, and the logical NAND of the counterpart signal $\beta_{i-1}L$ and the non-complementary output signal of the second gate means 16, thereby generating the inverted values $h_i^+L$ and $h_i^-L$ of a redundant binary bit of the output of the redundant binary adder 2.

Next, the operation will be described.

The inverted values $f_i^+L$ and $f_i^-L$ of the redundant binary bit of the partial remainder input to the redundant binary adder 2 are received by the NAND gate of the second logical means 12, and a signal representing the logical NAND obtained by the NAND gate and a signal representing its inverted value output from an inverter are both input to the first gate means 15. The CMOS transmission gates constituting the first gate means 15 are controlled by the output of an NAND gate and its inverted value output from an inverter in the first logical means 11 which receives the redundant binary bit $e_i^+L$ and $e_i^-L$ of the divisor, and select one of the complementary signals fed from the second logical means 12, thereby supplying the selected signal to the second gate means 16 and the third gate means 17 as the signal $r_iH$, together with its inverted signal $r_iL$ produced by an inverter.

The CMOS transmission gates in the second gate means 16, being controlled by the signals $r_iH$ and $r_iL$, select one of the signals $l_{i-1}H$ and $l_{i-1}L$ generated by the fourth logical means 14 in the previous (i−1)-th bit stage, and supply the selected signal to the fifth logical means 18 together with its inverted signal through an inverter. The fifth logical means 18 obtains the logical NAND of the complementary output signal of the second gate means 16 and the signal $\beta_{i-1}H$ sent from the third gate means 17 in the previous stage to generate the inverted value $h_i^+L$ of the redundant binary bit of the addition output of the redundant binary adder 2, and obtains the logical NAND of the non-complementary output signal of the second gate means 16 and the signal $\beta_{i-1}L$ sent from the third gate means 17 in the previous stage to generate the inverted value $h_i^-L$ of a redundant binary bit of the addition output of the redundant binary adder 2, thereby supplying the addition outputs to the selector 4.

The redundant binary bit $e_i^-L$ of the divisor and the redundant binary bit $f_i^-L$ of the partial remainder are input to the fourth logical means 14 including a NAND gate which produces the logical NAND of the two inputs to generate the signal $l_iL$. The $l_iL$ and its inverted signal $l_iH$ by an inverter are both supplied to the next (i+1)-th stage. On the other hand, the redundant binary bit $e_i^+L$ of the divisor and the redundant binary bit $f_i^+L$ of the partial remainder are input to the third logical means 13 which produces the logical NAND of the two inputs and supplies it to the third gate means 17. The CMOS transmission gates of the third gate means 17 select one of the signal fed from the third logical means 13 and the signal $l_{i-1}H$ fed from the fourth logical means 14 in the previous (i−1)-th stage in response to the signals $r_iH$ and $r_iL$ output from the first gate means 15 to generate the signal $\beta_iL$ and its inverted signal $\beta_iH$ with an inverter, thereby supplying them to the next stage.

The redundant binary numbers in the redundant binary adder 2 of the divider in accordance with the present invention are all represented in the ternary form in which −1 is represented by (0, 1), 0 is represented by (0, 0), and +1 is represented by (1, 0), which are defined as a subtraction of two binary numbers. In such a redundant binary number system, since the exchange of the positions of pair digits in a bit constituting a redundant binary number inverts its sign, an adder will be changed to a subtracter by exchanging the connection of a pair of digits. Therefore, the redundant binary subtractor 3 as shown in FIG. 1A has the same configuration as the redundant binary adder 2 except for exchanging the places of the pair digits of one of the inverted values $(e_i^+L, e_i^{31}L)$ and $(f_i^+L, f_i^-L)$.

Figure 3:
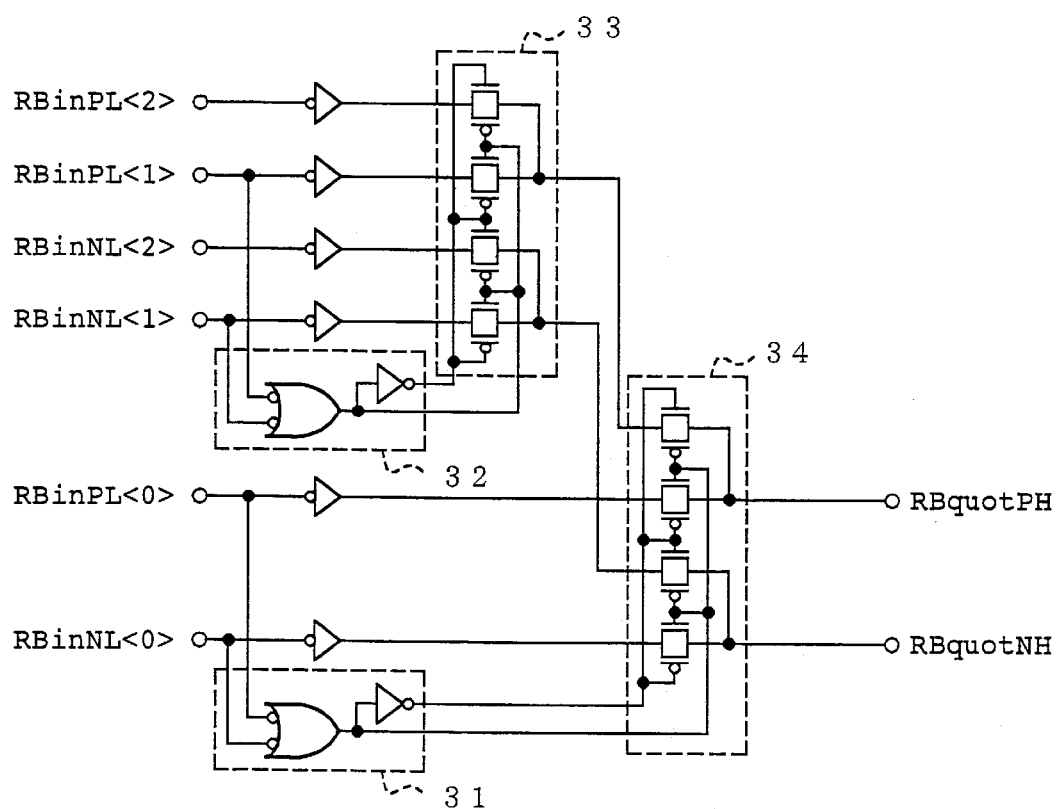
FIG. 3 is a circuit diagram showing a quotient decision circuit in the embodiment 1.

FIG. 3 is a circuit diagram showing the quotient decision circuit 1 which makes a decision of the sign of a quotient bit from the upper three bits RBin<0>–RBin<2> of the redundant binary number RBin<0>–RBin<n> the (j−1)-th partial remainder input to the quotient decision circuit 1, and which outputs a bit pair (RBquotPH, RBquotNH) of the decision result RBquot. Here, RBin<i> is a bit pair consisting of (RBinPH<i>, RBinNH<i>), where RBinPL<i> is an inverted value of RBinPH<i> and RBinNL<i> is an inverted value of RBinNH<i>.

In this figure, the reference numeral 31 designates a first zero decision means for making a zero decision of the most significant digit RBin<0> the redundant binary number, and for generating a pair of signals representing a logical AND of its bit pair RBinPL<0> and RBinNL<0>, and the inverted value of the logical AND. The reference numeral 32 designates a second zero decision means for making a zero decision of the second significant digit RBin<1> the redundant binary number, and for generating a pair of signals representing a logical AND of its bit pair RBinPL<1> and RBinNL<1>, and the inverted value of the logical AND. The reference numeral 33 designates a first selector means for selecting one of two bit pairs associated with the second digit RBin<1> and the third digit RBin<2> the redundant binary number in response to the pair of signals output from the second zero decision means 32, and 34 designates a second selector means for selecting one of two bit pairs associated with the selected signals output from the first selector means 33 and the most significant digit RBin<0> the redundant binary number in response to the pair of signals output from the first zero decision means 31, thereby outputting the decision result as a bit pair RBquotPH and RBquotNH.

Next, the operation will be described.

The first zero decision means 31 decides whether or not the most significant digit RBin<0> the redundant binary number is (0, 0), that is, whether its bit pair RBinPL<0> and RBinNL<0> are both one or not. Unless the bit pair are both 1, the sign of the quotient bit is known from this bit, in which case gates of the second selector means 34 are controlled by the pair signals output from the first zero decision means 31 such that the inverted values of the bit pair RBinPL<0> and RBinNL<0> the most significant digit RBin<0> the redundant binary number are output as the bit pair RBquotPH and RBquotNH of the decision result RBquot. If the most significant digit RBin<0> the redundant binary number is (0, 0), that is, if its bit pair RBinPL<0> and RBinNL<0> are both 1, the gates of the second selector means 34 select the outputs of the first selector means 33 in response to the pair of signals output from the first zero decision means 31.

In the course of this, the second zero decision means 32 makes a decision whether or not the second significant digit RBin<1> the redundant binary number is (0, 0), that is, whether its bit pair RBinPL<1> and RBinNL<1> are both one or not. Unless the bit pair are both 1, the sign of the quotient bit is known from this bit, in which case gates of the first selector means 33 are controlled by the pair signals output from the second zero decision means 32 such that the inverted values of the bit pair RBinPL<1> and RBinNL<1> the second significant digit RBin<1> the redundant binary number are output as the bit pair RBquotPH and RBquotNH of the decision result RBquot through the second selector means 34.

If the bit pair RBinPL<1> and RBinNL<1> the second significant digit of the redundant binary number are both 1, the gates of the first selector means 33 are controlled by the pair signals output from the second zero decision means 32 such that the inverted values of the bit pair RBinPL<2> and RBinNL<2> the third significant digit RBin<2> the redundant binary number are output as the bit pair RBquotPH and RBquotNH of the decision result RBquot through the second selector means 34. If the third digit RBin<2> the redundant binary number is (0, 0), that is, if its bit pair RBinPL<2> and RBinNL<2> are both 1, the sign cannot be decided because the bit pair RBquotPH and RBquotNH of the decision result RBquot become 0. In this case, they are handled as they are without change.

Since the decision of the sign is thus simplified in the ternary redundant binary representation in which (−1, 0, +1) is represented by (01, 00, 10), that is, the redundant binary number is defined as a subtraction of a pair of binary numbers, the quotient decision circuit 1 is also simplified as shown in FIG. 3, resulting in fast computation. The circuit as shown in FIG. 3 has a critical path with five logical stages consisting of fast logical elements of path gates, inverters and two-input NAND gates. Moreover, since the redundant binary adder 2 used for computing the partial remainder as shown in FIG. 2 employs the same redundant binary representation as the quotient decision circuit 1, the conversion between the two circuits is unnecessary. The delay involved in the quotient decision is of vital importance because the redundant binary adder 2 and the redundant binary subtractor 3 operate very fast, and hence the section consisting of the quotient decision circuit 1 and the selector 4 constitutes the critical path of the divider.

The selector 4, operating in response to the output of the quotient decision circuit 1, that is, in response to one of three conditions that the quotient bit is positive, negative and zero, selects one of the output of the redundant binary adder 2, the output of the redundant binary subtractor 3, and the (j−1)-th partial remainder as the j-th partial remainder. When the output RBquotPH of the quotient decision circuit 1 is logic 1, the quotient bit is positive, and the RBquotPH can be used as a signal for making decision that "the quotient bit is positive" without change because the RBquotPH and RBquotNH never become 1 at the same time. Likewise, when the output RBquotNH of the quotient decision circuit 1 is logic 1, the quotient bit is negative, and the RBquotPH can be used as a signal for making decision that "the quotient bit is negative" without change because the RBquotPH and RBquotNH never become 1 at the same time. The selector 4 selects the output of the redundant binary subtractor 3 if the decision result RBquot fed from the quotient decision circuit 1 indicates that "the quotient bit is positive", and the output of the redundant binary adder 2 if it indicates that "the quotient bit is negative", thereby outputting the selected one as the j-th partial remainder.

Figure 4:
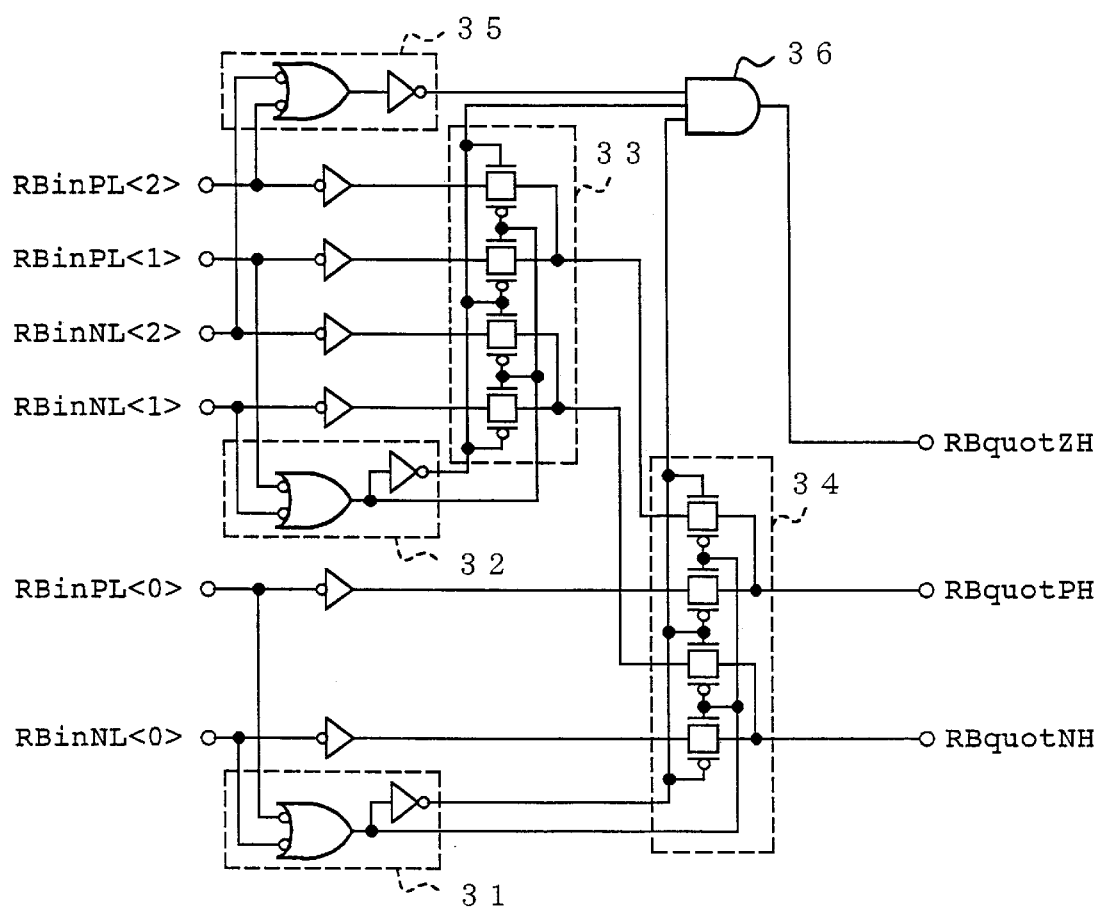
FIG. 4 is a circuit diagram showing a variation of the quotient decision circuit in the embodiment 1.
Figure 5:
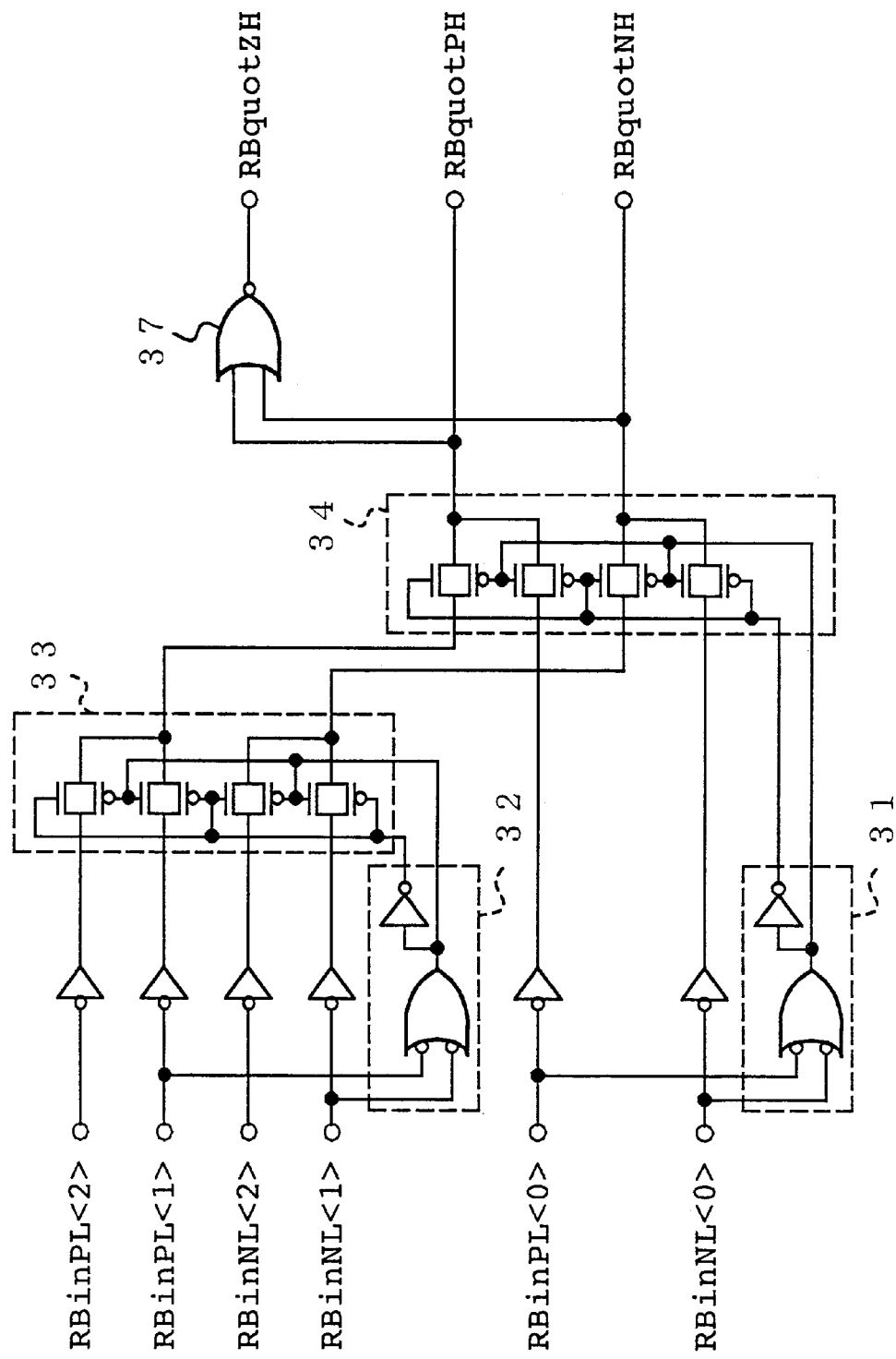
FIG. 5 is a circuit diagram showing another variation of the quotient decision circuit in the embodiment 1.

It is further needed here to make a decision that "the quotient bit is zero". FIGS. 4 and 5 show examples of the quotient decision circuit 1 including an additional function of outputting a signal RBquotZH indicating that. The quotient decision circuit 1 as shown in FIG. 4 comprises a third zero decision means 35 for making a zero decision of the third digit RBin<2> the redundant binary number, thereby generating a signal representing the logical AND of its bit pair RBinPL<2> and RBinNL<2>, and a sixth logical means 36 for producing the logical AND of the logical AND outputs of the first, second and third zero decision means 31, 32 and 35, thereby generating the signal RBquotZH. The quotient decision circuit 1 as shown in FIG. 5 generates the signal RBquotZH by obtaining by a seventh logical means 37 the logical NOR of the signals RBquotPH and RBquotNH output from the second selector means 34.

Accordingly, if the entire bit pairs of the upper three digits RBin<0>–RBin<2> the (j−1)-th partial remainder are all (0, 0), the signal RBquotZH indicating that "the quotient bit is zero" output from the quotient decision circuit 1 is 1, and the remaining outputs RBquotPH and RBquotNH are both 0. The selector 4, in response to this, selects the (j−1)-th partial remainder to output it as the j-th partial remainder. The configuration as shown in FIG. 4, in which the signal RBquotZH is generated by obtaining the logic AND of the outputs of the first to third zero decision means 31, 32 and 35 through the sixth logical means 36, makes fast operation possible, whereas the configuration as shown in FIG. 5, in which the signal RBquotZH is generated by obtaining the logic NOR of the signals RBquotPH and RBquotNH through the seventh logical means 37, makes it possible to reduce the number of circuit elements.

According to the embodiment 1 of the divider, an advantage is gained that high speed division is possible because the quotient decision circuit 1 has a configuration capable of fast operation. In addition, using the same redundant binary representation consistently throughout the divider obviates the converter for converting the different redundant binary representations, which was needed in the conventional system.

EMBODIMENT 2

Figure 6:
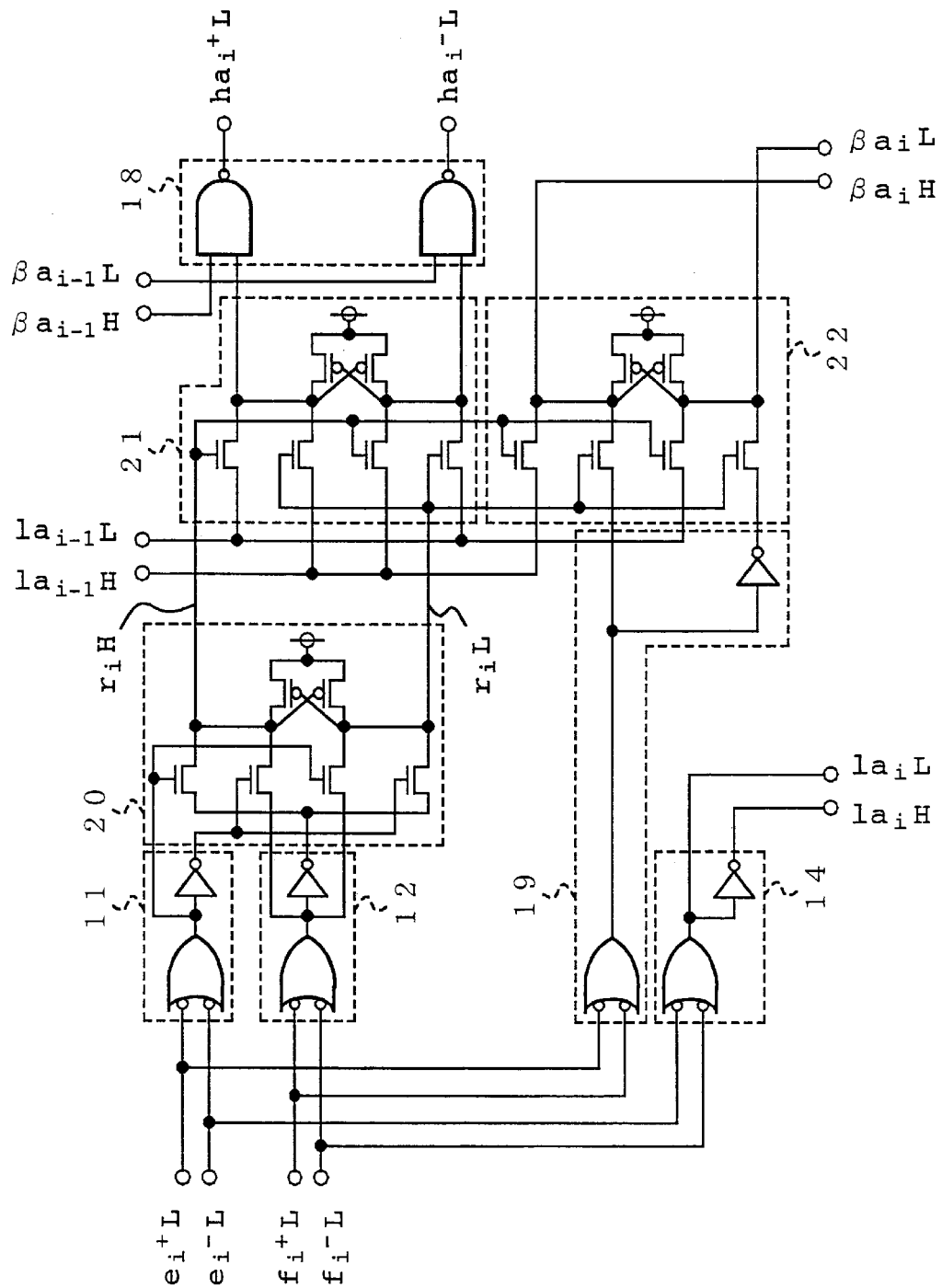
FIG. 6 is a circuit diagram showing a configuration for one bit of a redundant binary adder in an embodiment 2 of the divider in accordance with the present invention.

Although the circuit as shown in FIG. 2 is used as the redundant binary adder 2 and the redundant binary subtractor 3 in the embodiment 1, other circuit configurations can be employed. FIG. 6 is a circuit diagram showing a configuration for one bit of the redundant binary adder 2 of an embodiment 2 of the divider in accordance with the present invention, in which like portions to those of FIG. 2 are designated by the same reference characters, and the description thereof is omitted here. In this figure, the reference numeral 19 designates a third logical means different from the third logical means 13 in FIG. 2 in that it generates a pair of signals representing the logical AND of the redundant binary bit $e_i^+L$ of the divisor and the redundant binary bit $f_i^+L$ of the partial remainder, and representing the inverted value of the logical AND. The reference numeral 20 designates a first gate means different from the first gate means 15 in FIG. 2 in that it consists of NMOS transmission gates which output a pair of signals $r_iH$ and $r_iL$ by exchanging the output positions of the pair of signals which are complementary to each other output from the second logical means 12 in response to the output of the first logical means 11. The reference numeral 21 designates a second gate means different from the second gate means 16 in FIG. 2 in that it consists of NMOS transmission gates for providing the fifth logical means 18 with the signals $la_{i-1}H$ and $la_{i-1}L$ which are fed from the previous (i−1)-th stage and exchanged in their output positions in response to the signals $r_iH$ and $r_iL$. The reference numeral 22 designates a third gate means different from the third gate means 17 in FIG. 2 in that it consists of NMOS transmission gates for switching the pair of signals fed from the third logical means 19 and the pair of signals $la_{i-1}H$ and $la_{i-1}L$ fed from the previous (i−1)-th stage in response to the signals $r_iH$ and $r_iL$, and provides its output signals to the next (i+1)-th bit stage as the signals $\beta a_iH$ and $\beta a_iL$.

Although its basic operation is the same as that of the redundant binary adder 2 in the embodiment 1 as shown in FIG. 2, the circuit as shown in FIG. 6 operates faster than that as shown in FIG. 2. Thus, when the computation of the partial remainder forms a critical path, this circuit will speed up the overall computation. Incidentally, it depends on the bit width of the data which one of the quotient decision circuit 1 and the computation of the partial remainder constitutes the critical path because the delay of the selector 4 depends on the bit width. This is because although the time required for the data to pass through the selector 4 is nearly constant, the selection signal fed from the quotient decision circuit 1 increases its delay with its bit width.

EMBODIMENT 3

Figure 7:
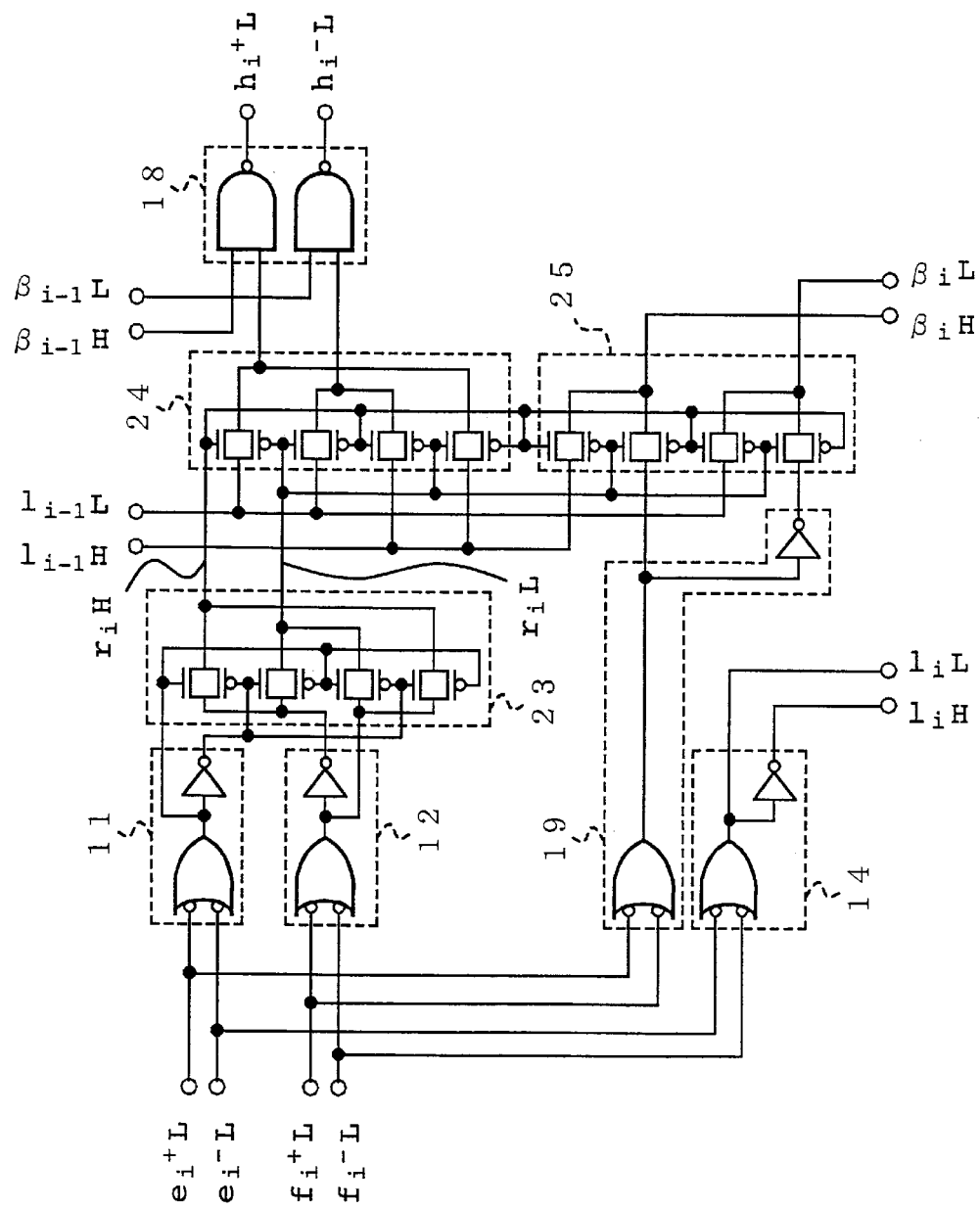
FIG. 7 is a circuit diagram showing a configuration for one bit of a redundant binary adder in an embodiment 3 of the divider in accordance with the present invention.

Although the NMOS transmission gates are used as the first to third gate means in the foregoing embodiment 2, they may be replaced by CMOS transmission gates. FIG. 7 is a circuit diagram showing a configuration for one bit of the redundant binary adder 2 of an embodiment 3 of the divider in accordance with the present invention, in which corresponding portions to those of FIG. 6 are designated by the same reference characters, and the description thereof is omitted here. In this figure, the reference numerals 23, 24 and 25 designate first, second and third gate means, respectively, in which the NMOS transmission gates in the corresponding gate means 20, 21 and 22 are replaced with CMOS transmission gates.

Next, the operation will be described.

The CMOS transmission gates constituting the first gate means 23 are controlled in response to the pair of signals fed from the first logical means 11 such that the non-complementary and complementary signals fed from the second logical means 12 are output as the signals $r_iH$ and $r_iL$, respectively, or as the signals $r_iL$ and $r_iH$ after being exchanged. The CMOS transmission gates of the second gate means 24 and those of the third gate means 25 are controlled by the signals $r_iH$ and $r_iL$ output from the first gate means 23. The second gate means 24 switches the signals $l_{i-1}H$ and $l_{i-1}L$ fed from the previous (i-1)-th stage in response to the signals $r_iH$ and $r_iL$, and supplies the switched signals to NAND gates of the fifth logical means 18. The third gate means 25 switches the pair of signals output from the third logical means 19 with the pair of signals $l_{i-1}H$ and $l_{i-1}L$ fed from the previous stage in response to the signals $r_iH$ and $r_iL$, and supplies the switched output signals to the next (i+1)-th stage as the signals $\beta_iH$ and $\beta_iL$. The remaining operations are the same as those of the embodiment 1.

The redundant binary adder of the embodiment 3 of the divider as shown in FIG. 7 operates faster than that of the embodiment 1 as shown in FIG. 2. Thus, when the computation of the partial remainder forms a critical path, this circuit will speed up the overall computation. Furthermore, the circuit of the embodiment 3 can achieve faster and more stable operation than that of the embodiment 2 as shown in FIG. 6 when a power supply with a lower voltage is used.

EMBODIMENT 4

Although the redundant binary adder 2 and redundant binary subtractor 3 are completely separated in the embodiment 1, they can be integrated into one redundant binary adder and subtractor so that part of the circuit can be shared. Specifically, since the signals $r_iH$ and $r_iL$ output from the first gate means 15 in the circuit as shown in FIG. 2 are logically equivalent in the adder and the subtractor, a portions associated with these signals can be made common.

Figure 8:
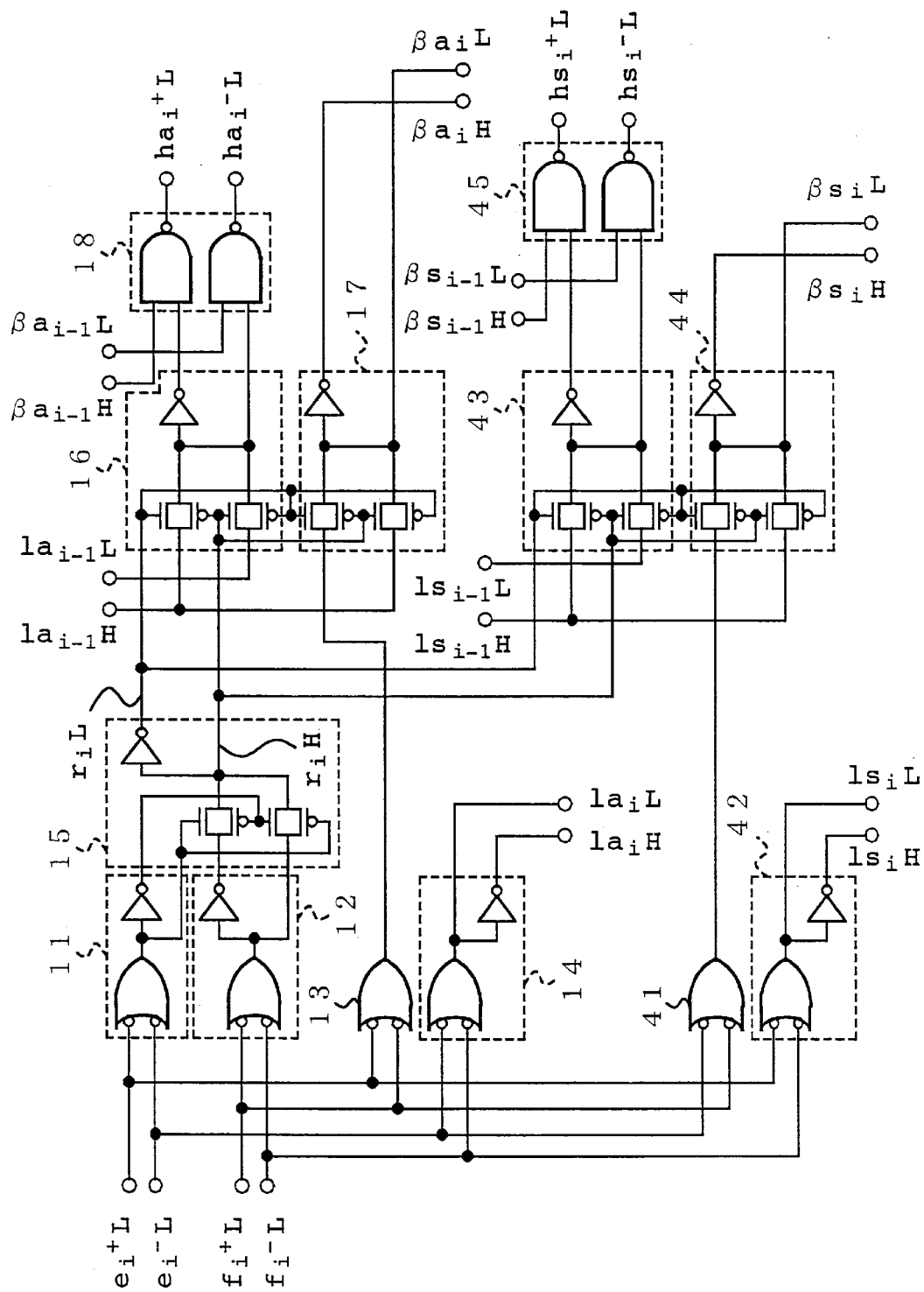
FIG. 8 is a circuit diagram showing a configuration for one bit of a redundant binary adder and subtractor in an embodiment 4 of the divider in accordance with the present invention.

FIG. 8 is a circuit diagram showing a configuration for one bit of a redundant binary adder and subtractor of an embodiment 4 of the divider in accordance with the present invention, in which the portion of the circuit is shared between the adder and subtractor. Its adder portion comprises the first to fourth logical means 11–14, first to third gate means 15–17, and the fifth logical means 18 as the redundant binary adder 2 of the embodiment 1 as shown in FIG. 2.

The reference numeral 41 designates an eighth logical means corresponding to the third logical means 13, and 42 designates a ninth logical means corresponding to the fourth logical means 14, in which the inverted values $e_i^+L$ and $e_i^-L$ of the redundant binary bit of the divisor are input to the eighth and ninth logical means 41 and 42 with their positions being exchanged from those when they are input to the third and fourth logical means 13 and 14. The reference numeral 43 designates a fourth gate means corresponding to the second gate means 16 in the adder portion, 44 designates a fifth gate means corresponding to the third gate means 17, and 45 designates a tenth logical means corresponding to the fifth logical means 18. The eighth to tenth logical means 41, 42 and 45 and the fourth and fifth gate means 43 and 44 constitute the subtractor section together with the first and second logical means 11 and 12 and the first gate means 15, which are shared with the adder portion.

The operation of the adder portion is the same as that of the redundant binary adder 2 in the embodiment 1 as shown in FIG. 2. The subtractor portion carries out the subtraction processing in the same manner as the adder portion except that either the pair of the inverted values $e_i^+L$ and $e_i^-L$ of the redundant binary bit of the divisor, or the pair of inverted values $f_i^+L$ and $f_i^-L$ of the redundant binary bit of the partial remainder (the pair of $e_i^+L$ and $e_i^-L$ in this figure) are input with their positions being exchanged.

Thus configuring the adder portion and the subtractor portion which share the first and second logical means 11 and 12 and the first gate means 15 makes it possible to implement a divider with a reduced number of components as compared with the embodiment 1.

EMBODIMENT 5

Figure 9:
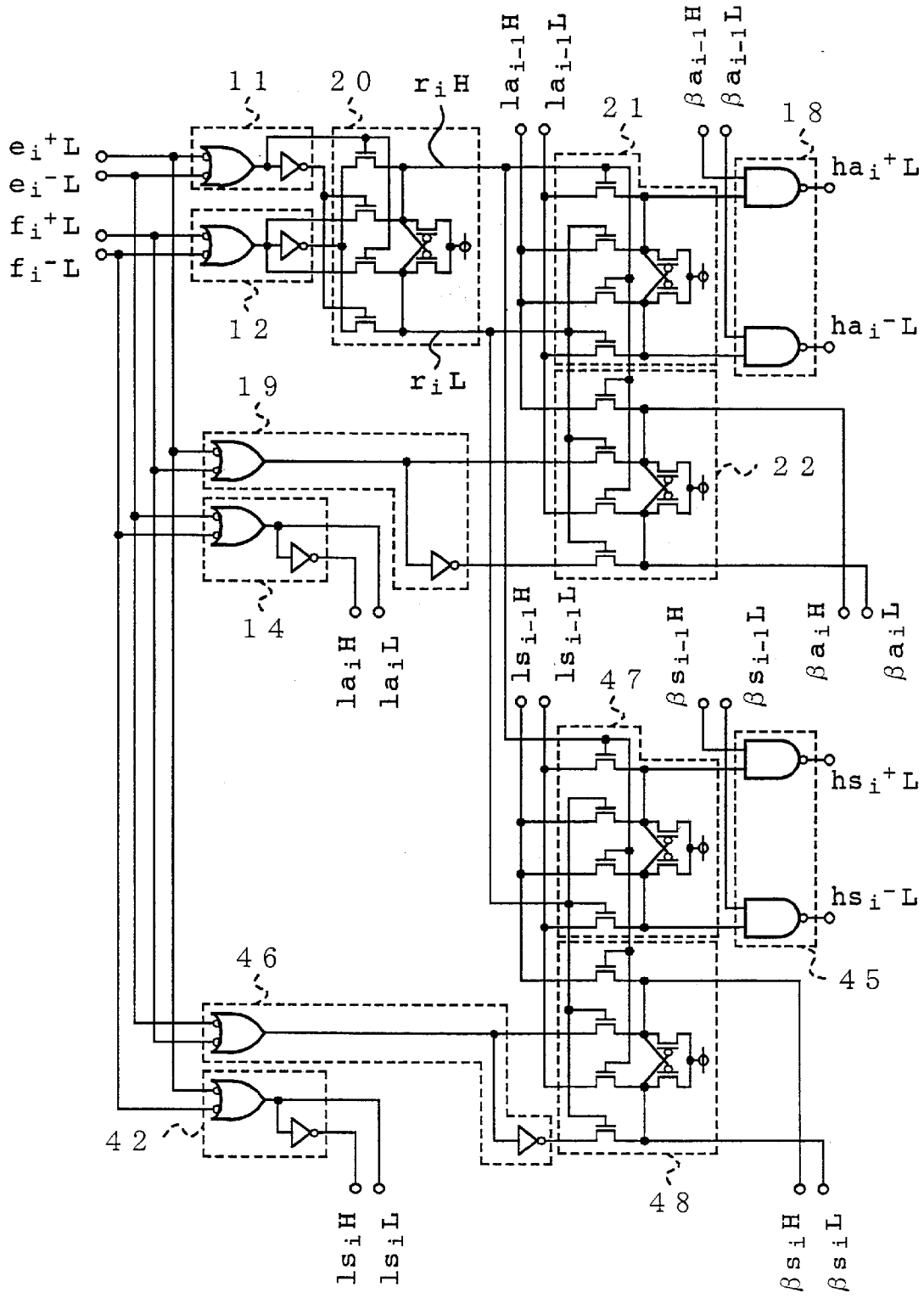
FIG. 9 is a circuit diagram showing a configuration for one bit of a redundant binary adder and subtractor in an embodiment 5 of the divider in accordance with the present invention.

Such sharing of a part of the circuit between the adder portion and the subtractor portion can also be applied to the circuit of the embodiment 2. FIG. 9 is a circuit diagram showing a configuration for one bit of the redundant binary adder and subtractor of an embodiment 5 of the divider in accordance with the present invention. The adder portion comprises the first to fourth logical means 11, 12, 19 and 14, the first to third gate means 20–22, and the fifth logical means 18, as the redundant binary adder in the embodiment 2 as shown in FIG. 6. The reference numeral 46 designates an eighth logical means corresponding to the third logical means 19, 42 designates a ninth logical means corresponding to the fourth logical means 14, 47 designates a fourth gate means corresponding to the second gate means 21, 48 designates a fifth gate means corresponding to the third gate means 22, and 45 designates a tenth logical means corresponding to the fifth logical means 18. The inverted values $e_i^+L$ and $e_i^-L$ of the redundant binary bit of the divisor are input to the eighth and ninth logical means 46 and 42 with their positions being exchanged from those input to the adder portion, thereby constituting the subtractor portion.

Thus, the portion associated with the pair of signals $r_iH$ and $r_iL$ output from the first gate means 20 can be shared between the adder portion and the subtractor portion because the pair of signals are logically equivalent for both the addition and subtraction operations when computing the partial remainder. This makes it possible to reduce the number of components of the divider as compared with the embodiment 2, and to increase the operation speed as compared with the embodiment 4.

EMBODIMENT 6

Figure 10:
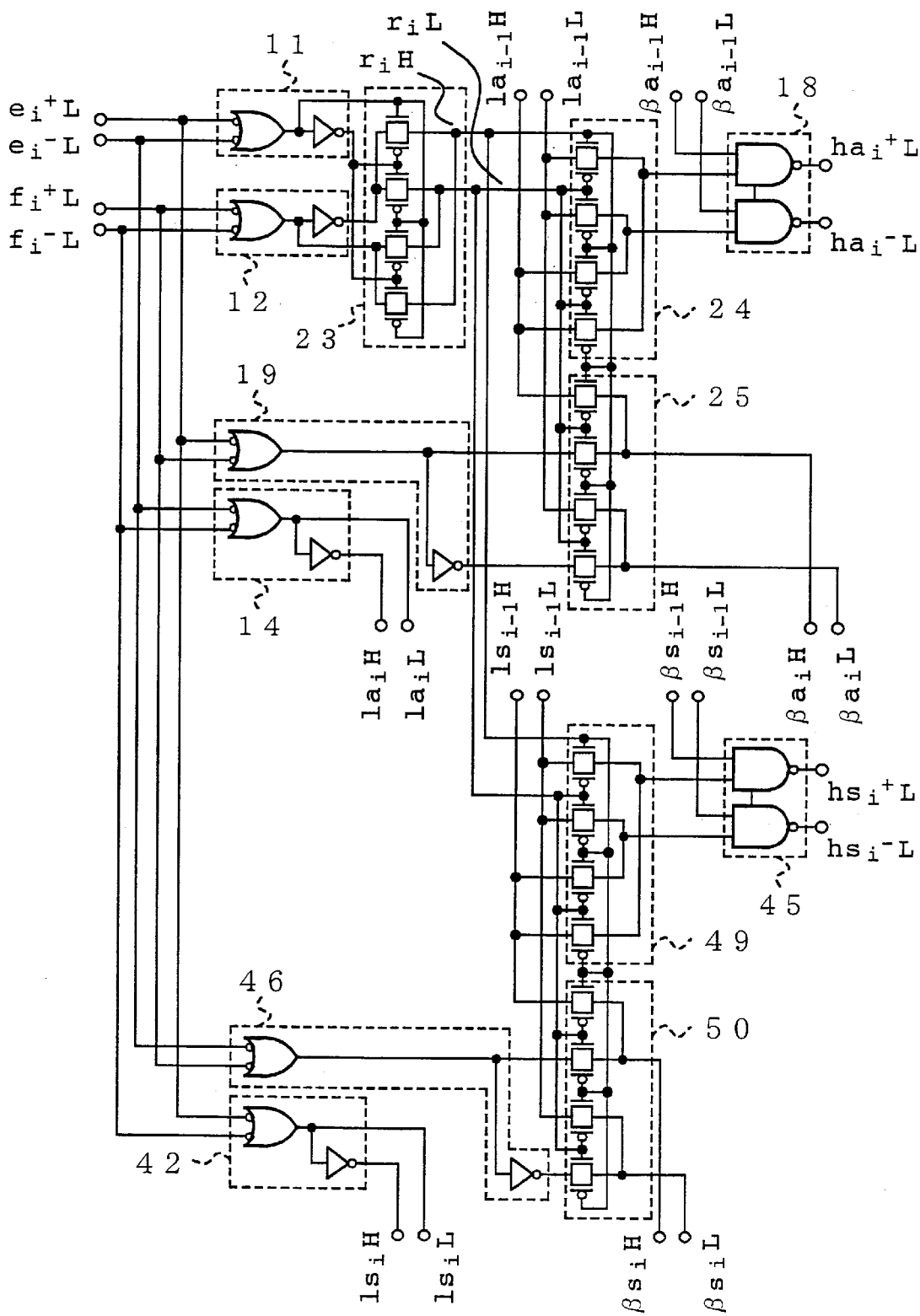
FIG. 10 is a circuit diagram showing a configuration for one bit of a redundant binary adder and subtractor in an embodiment 6 of the divider in accordance with the present invention.

Such sharing of a part of the circuit between the adder portion and the subtractor portion can also be applied to the circuit of the embodiment 3. FIG. 10 is a circuit diagram showing a configuration for one bit of the redundant binary adder and subtractor of an embodiment 6 of the divider in accordance with the present invention. The adder portion comprises the first to fourth logical means 11, 12, 19 and 14, the first to third gate means 23–25, and the fifth logical means 18, as the redundant binary adder in the embodiment 3 as shown in FIG. 7. The reference numeral 46 designates an eighth logical means corresponding to the third logical means 19, 42 designates a ninth logical means corresponding to the fourth logical means 14, 49 designates a fourth gate means corresponding to the second gate means 24, 50 designates a fifth gate means corresponding to the third gate means 25, and 45 designates a tenth logical means corresponding to the fifth logical means 18. The inverted values $e_i^+L$ and $e_i^-L$ of the redundant binary bit of the divisor are input to the eighth and ninth logical means 46 and 42 with their positions being exchanged from those input to the adder portion, thereby constituting the subtractor portion.

In this case also, the portion associated with the pair of signals $r_iH$ and $r_iL$ output from the first gate means 23 can be shared between the adder portion and the subtractor portion because the pair of signals are logically equivalent for both the addition and subtraction operations when computing the partial remainder. This makes it possible to implement the divider with the reduced number of components as compared with the embodiment 3, to achieve faster operation than the embodiment 4, and to implement faster and more stable operation than the embodiment 5 when a lower supply voltage is used.

EMBODIMENT 7

Although the foregoing embodiments comprises individual sections for carrying out addition and subtraction in parallel, such as the separate redundant binary adder and redundant binary subtractor, or the redundant binary adder and subtractor including the adder portion and the subtractor portion, they can be replaced with a redundant binary adder with a function of switching the addition and subtraction.

Figure 11:
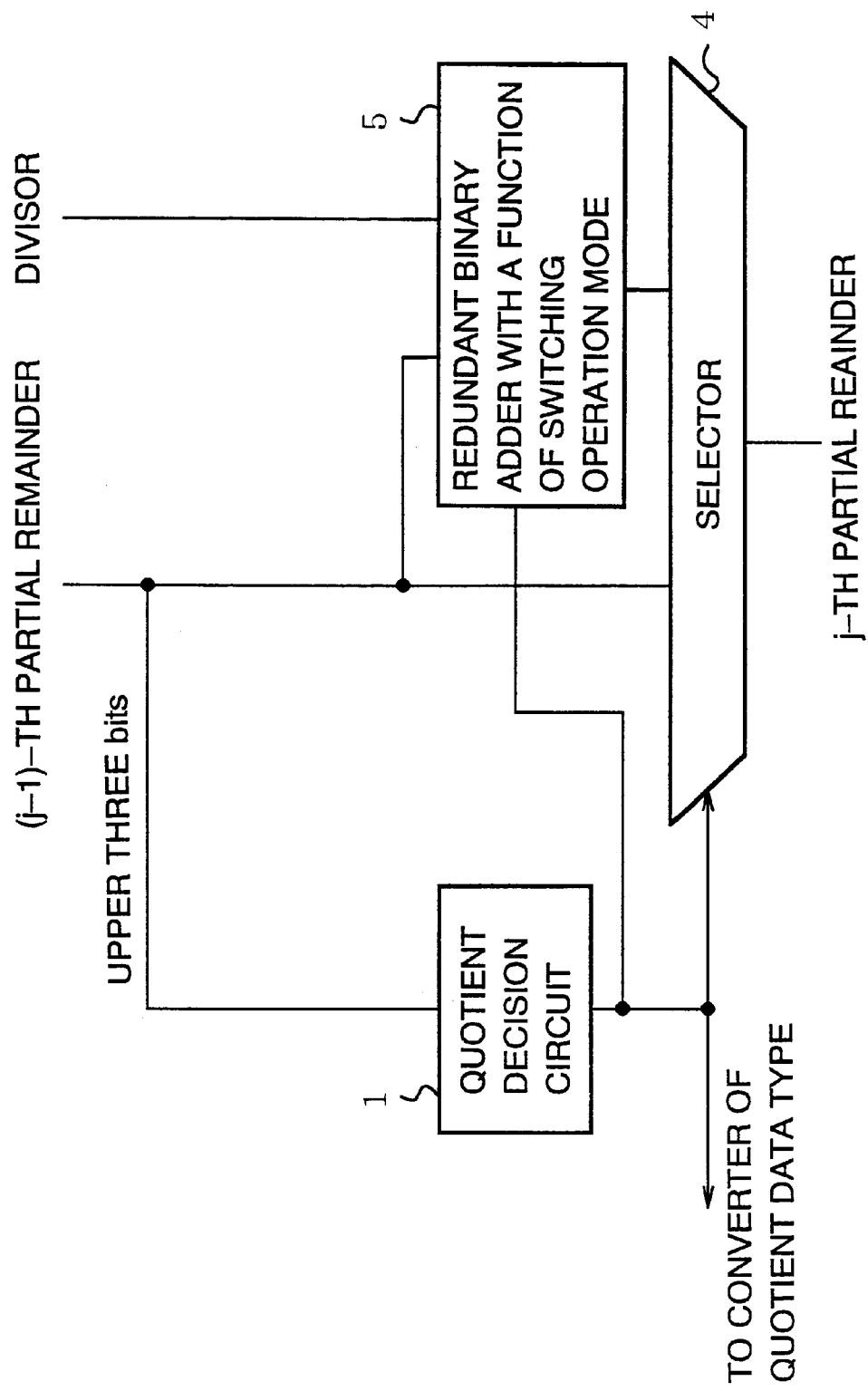
FIG. 11 is a block diagram showing a major portion of an embodiment 7 of the divider in accordance with the present invention.

FIG. 11 is a block diagram showing a major portion of an embodiment 7 of the divider in accordance with the present invention, which shows the j-th stage of the redundant binary divider array. In this figure, the reference numeral 1 designates the quotient decision circuit which is the same as that of the embodiment 1, and 5 designates a redundant binary adder with a function of switching addition and subtraction by exchanging the bits of the bit pair of the redundant binary number of the divisor or the (j−1)-th partial remainder input thereto. The reference numeral 4 designates a selector for selecting one of the output of the redundant binary adder 5 and the (j−1)-th partial remainder, and outputs the selected one as the j-th partial remainder.

Figure 12:
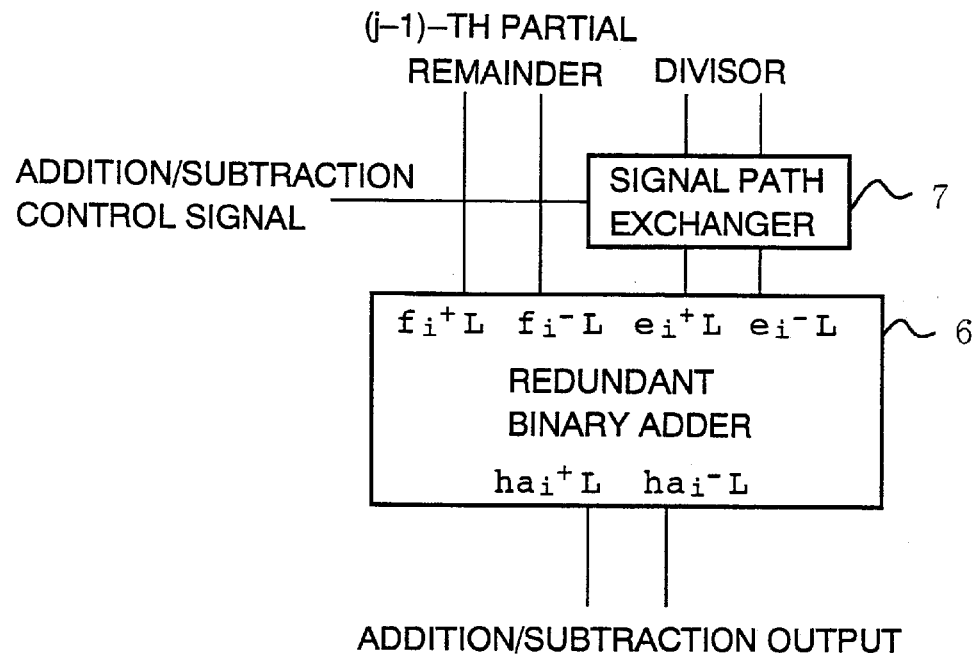
FIG. 12 is a block diagram showing a configuration for one bit of a redundant binary adder with a function of switching an operation mode of an embodiment 7 of the divider in accordance with the present invention.

FIG. 12 is a block diagram showing a configuration for one bit of the redundant binary adder 5 with the switching function used in the embodiment 7. In this figure, the reference numeral 6 designates the same redundant binary adder as the redundant binary adder 2 of the embodiment 1, and 7 designates a signal path exchanger for exchanging the bit pair of the redundant binary number of the divisor in response to a control signal fed from the quotient decision circuit 1.

Next, the operation will be described.

Figure 13:
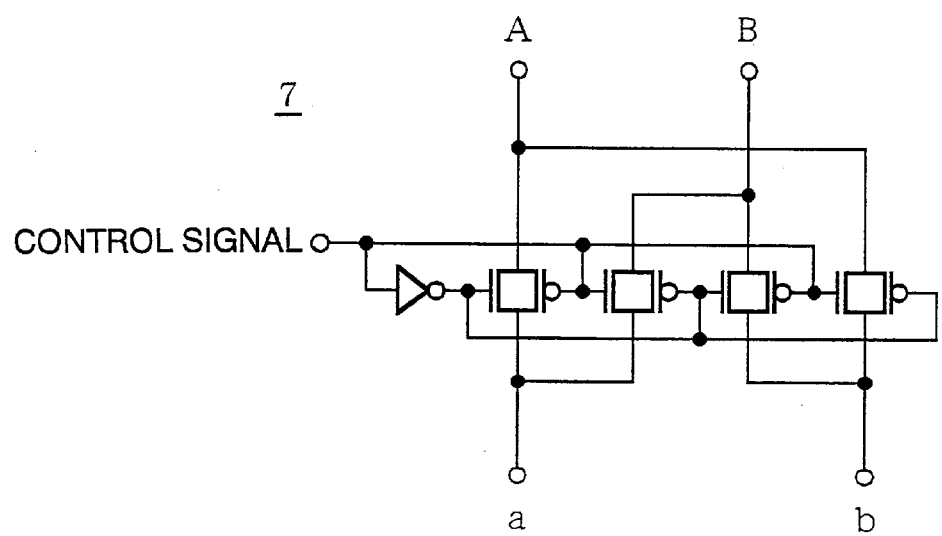
FIG. 13 is a circuit diagram showing a signal path selection circuit of the embodiment 7 of the divider in accordance with the present invention.

In the signal path exchanger 7 as shown in FIG. 13, the conducting state of CMOS transmission gates is controlled in response to the input control signal. For example, if the control signal is at a low level, the signal input to the terminal A is output from the terminal a, and the signal input to the terminal B is output from the terminal b in FIG. 13. On the other hand, if the control signal is at a high level, the signal input to the terminal A is output from the terminal b, and the signal input to the terminal B is output from the terminal a. Thus inputting the bit pair $e_i^+L$ and $e_i^-L$ of the redundant binary number of the divisor to the redundant binary adder 6 through the signal path exchanger 7 as shown in FIG. 13 enables the bit pair $e_i^+L$ and $e_i^-L$ to be input without change or with their positions being exchanged in response to the control signal.

The quotient decision circuit 1 makes the sign decision by using the upper three bits of the (j−1)-th partial remainder, and outputs the bit pair RBquotPH, RBquotNH and RBquotZH as the decision result. Accordingly, inputting the resultant bit pair RBquotPH or RBquotNH to the redundant binary adder 5 with the operation mode switching function makes it possible to switch between the addition and subtraction of the redundant binary adder 6 in response to the decision result of the quotient decision circuit 1. The selector 4 selects one of the output of the redundant binary adder 5 with the operation mode switching function and the (j−1)-th partial remainder in response to the signals RBquotPH, RBquotNH and RBquotZH, and outputs the selected one as the j-th partial remainder.

Although the operation speed of the divider with such an arrangement drops because the operations of the quotient decision circuit 1 and the redundant binary adder 6 are carried out in sequence, the amount of hardware can be reduced because it is not necessary to provide both the redundant binary adder 2 and redundant binary subtractor 3 as in the embodiment 1.

EMBODIMENT 8

Figure 14:
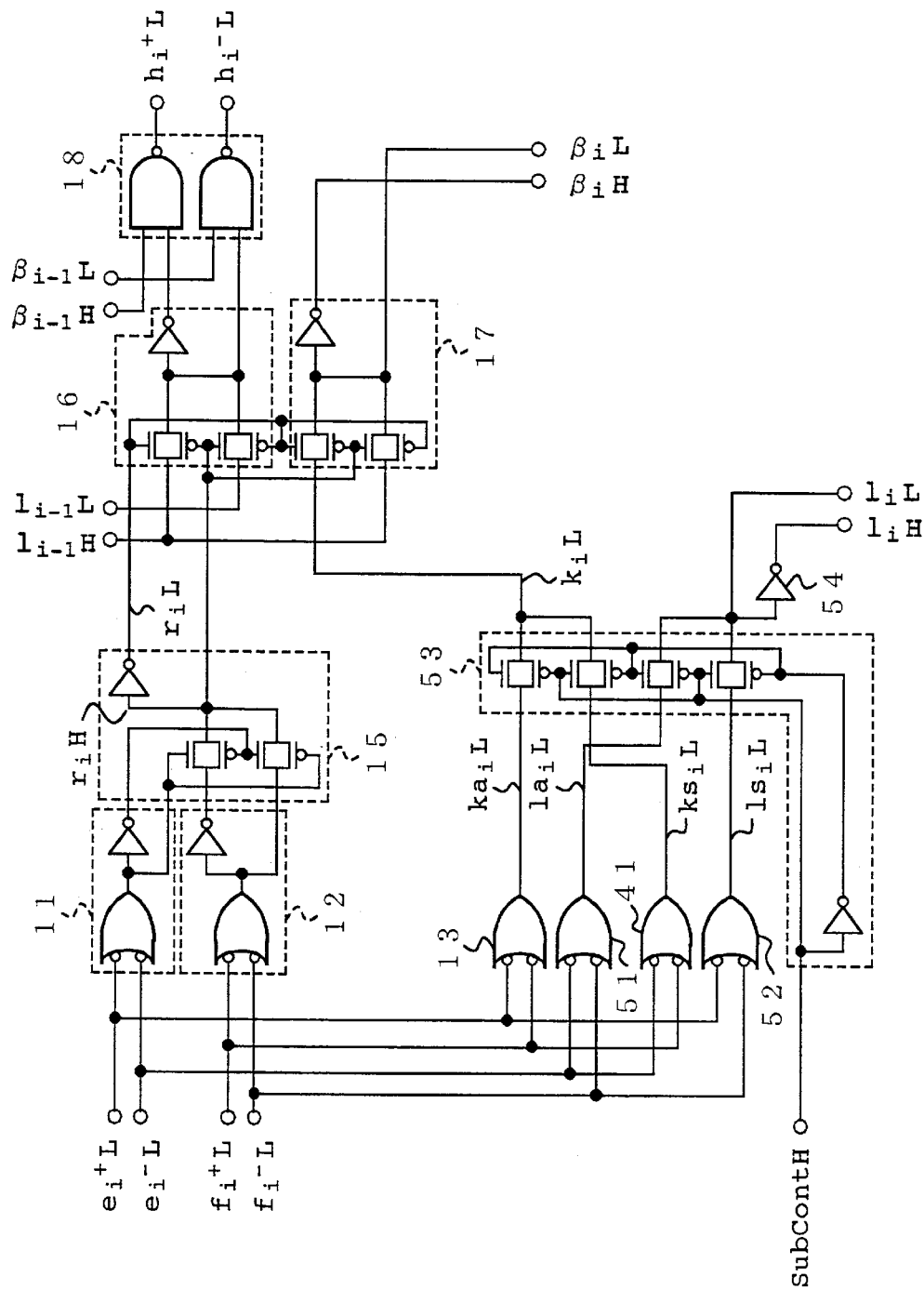
FIG. 14 is a circuit diagram showing a configuration for one bit of a redundant binary adder with the function of switching the operation mode of an embodiment 8 of the divider in accordance with the present invention.
Figure 15:
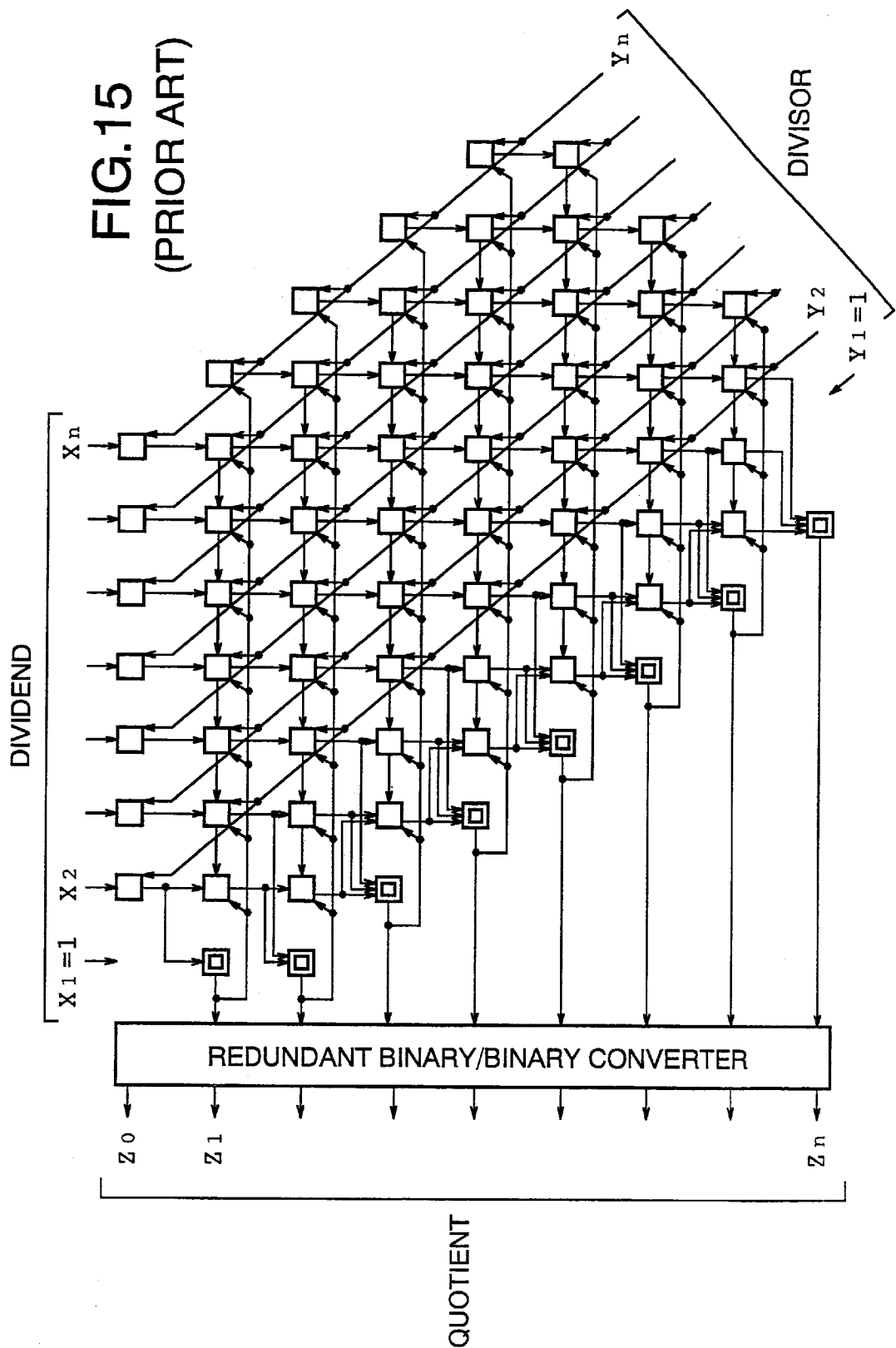
FIG. 15 is a block diagram showing the entire configuration of a conventional divider.
Figure 16:
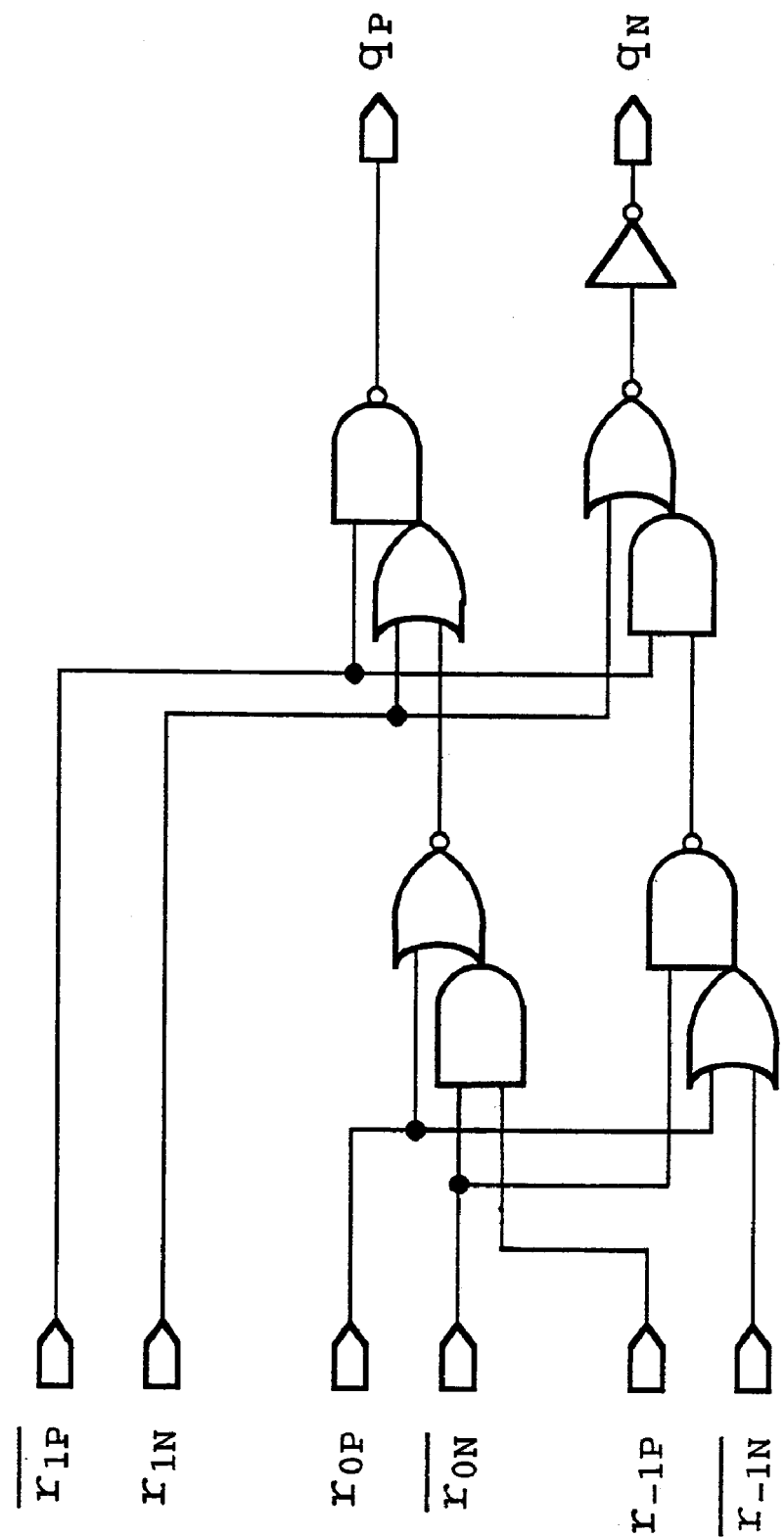
FIG. 16 is a circuit diagram showing a conventional quotient decision circuit.
Figure 17:
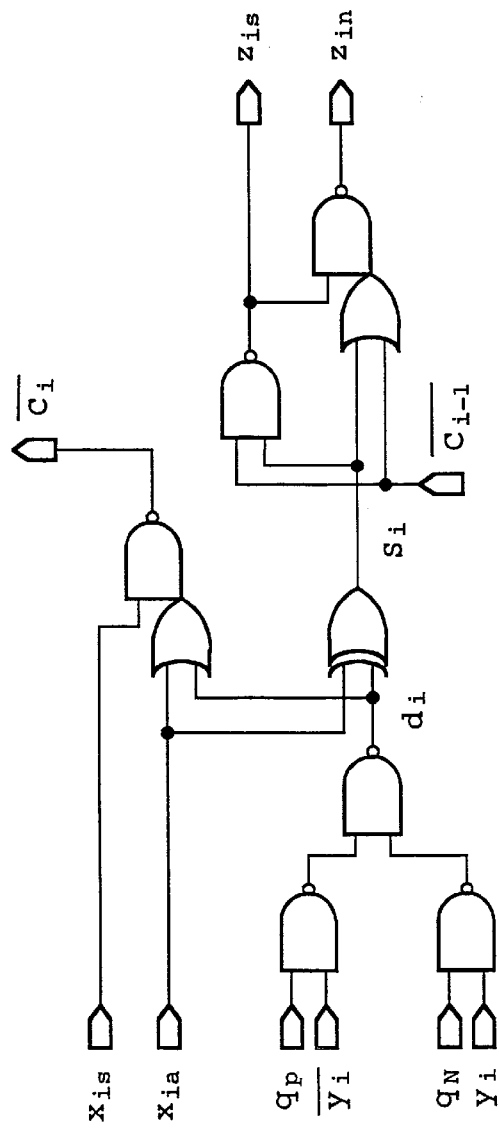
FIG. 17 is a circuit diagram showing a configuration for one bit of a conventional partial remainder computing circuit.
Figure 18:
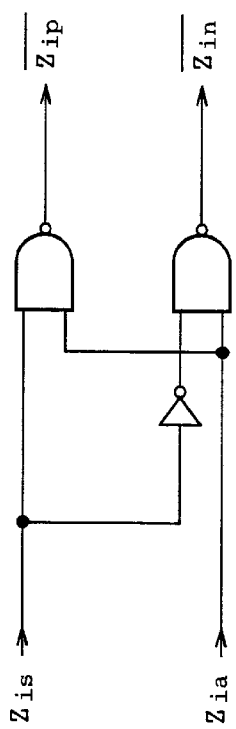
FIG. 18 is a circuit diagram showing a conventional converter of a redundant binary number.
Figure 19:
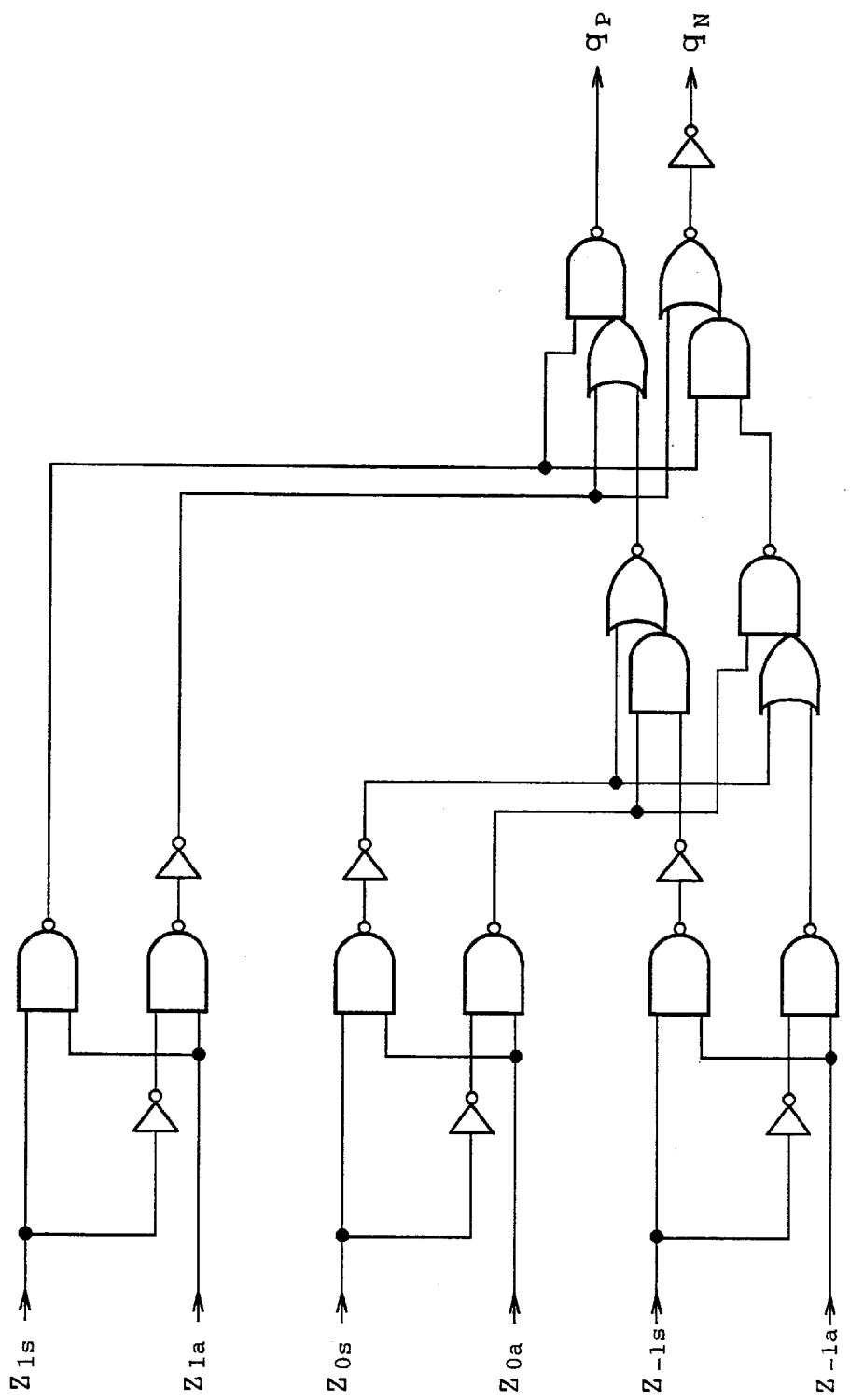
FIG. 19 is a circuit diagram showing a quotient decision circuit to which the conventional converters of the redundant binary number are connected.

FIG. 14 is a circuit diagram showing a redundant binary adder with a function of switching the operation mode, which is used in an embodiment 8 of the divider in accordance with the present invention. In FIG. 14, portions corresponding to those of FIG. 8 are designated by the same reference characters and the description thereof is omitted here. In FIG. 14, the reference numeral 51 designates an eleventh logical means corresponding to the fourth logical means 14, and 52 designates a twelfth logical means corresponding to the ninth logical means 42. The eleventh logical means 51 outputs the signal $la_iL$, and the twelfth logical means 52 outputs the signal $ls_iL$. They differ from the fourth logical means 14 and the ninth logical means 42 in that they output only one signal, and do not output their complementary signal $la_iH$ or $ls_iH$. The reference numeral 53 designates a signal path selecting means for generating a signal $k_iL$ by selecting one of a signal $ka_iL$ output from the third logical means 13 and a signal $ks_iL$ output from the eighth logical means 41 in response to a control signal SubCont, transfers the selected signal to the third gate means 17, and generating a signal $l_iL$ by selecting one of the signal $la_iL$ output from the eleventh logical means 51 and a signal $ls_iL$ output from the twelfth logical means 52 in response to a control signal SubCont. The reference numeral 54 designates a logic inverting means for inverting the signal $l_iL$ generated by the signal path selecting means 53 to generate the signal $l_iH$. The signals $l_iL$ and $l_iH$ are sent to the next stage, that is, to the (i+1)-th bit.

Next, the operation will be described.

As described in the foregoing embodiment 4 in connection with FIG. 8, the signals $r_iH$ and $r_iL$ output from the first gate means 15 of the redundant binary adder undergo the same logical operations in both addition and subtraction. The signal $k_iL$ input to the third gate means 17 and the signal $l_iL$ supplied to the next stage ((i+1)-th bit) undergo different operations in the addition and subtraction. Taking account of this, the signals $ka_iL$ and $la_iL$ corresponding to the signals $k_iL$ and $l_iL$ in the addition operation, and the signals $ks_iL$ and $ls_iL$ corresponding to the signals $k_iL$ and $l_iL$ in the subtraction operation, are generated by the third and eighth logical means 13 and 41, and the eleventh and twelfth logical means 51 and 52 in advance, respectively, so that the signal path selecting means 53 selects the signals $ka_iL$ and $la_iL$ as the signals $k_iL$ and $l_iL$, respectively, in the addition mode, whereas the signals $ks_iL$ and $ls_iL$ as the signals $k_iL$ and $l_iL$, respectively, in the subtraction mode, thereby implementing the function equivalent to that of the embodiment 7.

The redundant binary adders in the embodiments 2 and 3 can also be varied in a similar fashion because the varied portion in FIG. 14 is the same as the corresponding portions in FIGS. 2, 6 and 7.

Since the redundant binary adder with a function of switching the operation mode in the embodiment 8 postpones the switching operation of the signal path as compared with the embodiment 7, the switching operation overlaps with the operation in the front portion of the redundant binary adder. This ameliorates a demerit in the speed as compared with the embodiment 7.

What is claimed is:

1. A divider comprising:

a quotient decision circuit for making a sign decision of a quotient bit from upper three bits of a (j−1)-th partial remainder represented by a redundant binary number, said redundant binary number representing its −1 by (0, 1), 0 by (0, 0) and 1 by (1, 0);

a redundant binary adder for adding a divisor represented by said redundant binary number to said (j−1)-th partial remainder represented by said redundant binary number;

a redundant binary subtractor for subtracting said divisor represented by said redundant binary number from said (j−1)-th partial remainder represented by said redundant binary number; and a selector for selecting, in response to a decision result of said quotient decision circuit, one of an output of said redundant binary adder, said (j−1)-th partial remainder, and an output of said redundant binary subtractor, and for outputting a selected signal as a j-th partial remainder represented by said redundant binary number, wherein said quotient decision circuit, said redundant binary adder, said redundant binary subtractor and said selector each use the redundant binary number representation, in which −1 is represented by (0, 1), 0 by (0, 0) and 1 by (1, 0).

2. The divider as claimed in claim 1, further comprising means for converting a bit pair (1, 1) into a bit pair (0, 0) when converting said divisor into a redundant binary number by generating bit pairs from said divisor and twice said divisor.

3. The divider as claimed in claim 1, wherein said quotient decision circuit comprises:

first zero decision means for making a zero decision of a most significant redundant binary digit of said (j−1)-th partial remainder;

second zero decision means for making a zero decision of a second significant redundant binary digit of said (j−1)-th partial remainder;

first selector means for selecting one of the second significant redundant binary digit of said (j−1)-th partial remainder and a third significant redundant binary digit of said (j−1)-th partial remainder in response to an output of said second zero decision means; and second selector means for selecting one of the most significant redundant binary digit of said (j−1)-th partial remainder and an output of said first selector means in response to an output of said first zero decision means.

4. The divider as claimed in claim 3, wherein said quotient decision circuit further comprises:

third zero decision means for making zero decision of a third significant redundant binary digit of said (j−1)-th partial remainder;

first logical means for outputting a signal indicating that upper three digits of said (j−1)-th partial remainder are all zero in response to a logical value of an output of said third zero decision means and logical values of the outputs of said first and second zero decision means.

5. The divider as claimed in claim 1, wherein said redundant binary adder comprises:

first logical means for generating a pair of signals, one of which indicates a logical AND of inverted values $e_i^+L$ and $e_i^-L$ of a redundant binary bit of said divisor, and the other of which indicates an inverted value of said logical AND of the inverted values $e_i^+L$ and $e_i^-L$;

second logical means for generating a pair of signals, one of which indicates a logical AND of inverted values $f_i^+L$ and $f_i^-L$ of a redundant binary bit of said partial remainder, and the other of which indicates an inverted value of said logical AND of the inverted values $f_i^+L$ and $f_i^-L$, where i is a natural number representing a position of the redundant binary bit, and L represents an inverted value;

third logical means for generating a signal based on the inverted value $e_i^+L$ of the redundant binary bit of the divisor and the inverted value $f_i^+L$ of the redundant binary bit of the partial remainder;

fourth logical means for generating a pair of signals $l_iL$ and $l_iH$, one of which indicates a logical AND of the inverted value $e_i^-L$ of the redundant binary bit of the divisor and the inverted value $f_i^-L$ of the redundant binary bit of the partial remainder, and the other of which indicates an inverted value of said logical AND of the inverted values $e_i^-L$ and $f_i^-L$, and for sending the pair of signals $l_iL$ and $l_iH$ to a next stage;

first gate means for generating a signal $r_iH$ and its complementary signal $r_iL$ from an output of said second logical means in response to an output of said first logical means;

second gate means for generating signals $l_{i-1}L$ and $l_{i-1}H$ fed from the fourth logical means of a previous stage without change or with their positions being exchanged in response to said signals $r_iH$ and $r_iL$ output from said first gate means;

third gate means for generating a pair of signals $\beta_iH$ and $\beta_iL$ which are complementary to each other from an output of said third logical means and the signals $l_{i-1}L$ and $l_{i-1}H$ fed from said fourth logical means of the previous stage in response to the signals $r_iH$ and $r_iL$ output from said first gate means, and for supplying the pair of signals $\beta_iH$ and $\beta_iL$ to a next stage; and fifth logical means for generating inverted values $h_i^+L$ and $h_i^-L$ of a redundant binary bit of an addition output of said redundant binary adder from an output of said second gate means and signals $\beta_{i-1}H$ and $\beta_{i-1}L$ fed from said third gate means of the previous stage.

6. The divider as claimed in claim 5, wherein said first gate means of said redundant binary adder selects one of the complementary signals output from said second logical means in response to the output of said first logical means, and produces the selected signal as the signal $r_iH$, and its inverted signal as the signal $r_iL$;

said second gate means selects one of the pair of signals $l_{i-1}L$ and $l_{i-1}H$ fed from said fourth means of the previous stage in response to the signals $r_iH$ and $r_iL$ output from said first gate means, and produces the selected signal and its inverted signal; and said third gate means selects one of the signal $l_{i-1}H$ fed from said fourth logical means of the previous stage and the signal output from said third logical means in response to the signals $r_iH$ and $r_iL$ output from said first gate means, and produces the selected signal and its inverted signal as the signals $\beta_iH$ and $\beta_iL$.

7. The divider as claimed in claim 5, wherein said third logical means of said redundant binary adder generates a pair of signals, one of which indicates a logical AND of the inverted value $e_i^+L$ of the redundant binary bit of the divisor and the inverted value $f_i^+L$ of the redundant binary bit of the partial remainder, and the other of which indicates an inverted value of said logical AND of the inverted values $e_i^+L$ and $f_i^+L$;

said first gate means produces, in response to the output of said first logical means, the complementary signals output from said second logical means without or with their output positions being exchanged such that a non-inverted signal of the complementary signals is output as the signal $r_iH$ and an inverted signal of the complementary signals is output as the signal $r_iL$, or such that the non-inverted signal of the complementary signals is output as the signal $r_iL$ and the inverted signal of the complementary signals is output as the signal $r_iH$;

said second gate means produces the pair of signals $l_{i-1}L$ and $l_{i-1}H$ fed from said fourth means of the previous stage with their output positions being exchanged in response to the signals $r_iH$ and $r_iL$ output from said first gate means; and said third gate means selects, in response to the signals $r_iH$ and $r_iL$, one of two pairs of signals consisting of the pair of signals $l_{i-1}L$ and $l_{i-1}H$ fed from said fourth logical means of the previous stage and the pair of signals output from said third logical means, and produces the selected pair of signals as the signals $\beta_iH$ and $\beta_iL$.

8. The divider as claimed in claim 7, wherein said first gate means of said redundant binary adder comprises transmission gates controlled by the output of said first logical means; and said second gate means and said third gate means each comprise transmission gates controlled by the output of said first gate means.

9. The divider as claimed in claim 1, wherein said redundant binary adder and said redundant binary subtractor are integrated into one redundant binary adder and subtractor which comprises:

first logical means for generating a pair of signals, one of which indicates a logical AND of inverted values $e_i^+L$ and $e_i^-L$ of a redundant binary bit of said divisor, and the other of which indicates an inverted value of said logical AND of the inverted values $e_i^+L$ and $e_i^-L$;

second logical means for generating a pair of signals, one of which indicates a logical AND of inverted values $f_i^+L$ and $f_i^-L$ of a redundant binary bit of said partial remainder, and the other of which indicates an inverted value of said logical AND of the inverted values $f_i^+L$ and $f_i^-L$, where i is a natural number representing a position of the redundant binary bit, and L represents an inverted value;

third logical means for generating a signal based on the inverted value $e_i^+L$ of the redundant binary bit of said divisor and the inverted value $f_i^+L$ of the redundant binary bit of said partial remainder;

fourth logical means for generating a pair of signals $l_iL$ and $l_iH$, one of which indicates a logical AND of the inverted value $e_i^-L$ of the redundant binary bit of said divisor and the inverted value $f_i^-L$ of the redundant binary bit of said partial remainder, and the other of which indicates an inverted value of said logical AND of the inverted values $e_i^-L$ and $f_i^-L$;

first gate means for generating a signal $r_iH$ and its complementary signal $r_iL$ from an output of said second logical means in response to an output of said first logical means;

second gate means for generating signals $la_{i-1}L$ and $la_{i-1}H$ fed from the fourth logical means of a previous stage without change or with their positions being exchanged in response to said signals $r_iH$ and $r_iL$ output from said first gate means;

third gate means for generating a pair of signals $\beta a_iH$ and $\beta a_iL$ which are complementary to each other from an output of said third logical means and the signals $la_{i-1}L$ and $la_{i-1}H$ fed from said fourth logical means of the previous stage in response to the signals $r_iH$ and $r_iL$ output from said first gate means, and for supplying the pair of signals $\beta a_{i-1}H$ and $\beta a_{i-1}L$ to a next stage;

fifth logical means for generating inverted values $ha_i^+L$ and $ha_i^-L$ of a redundant binary bit of an addition output, from an output of said second gate means and signals $\beta a_{i-1}H$ and $\beta a_{i-1}L$ fed from said third gate means of the previous stage;

sixth logical means for inputting the inverted value $e_i^-L$ of the redundant binary bit of said divisor and the inverted value $f_i^+L$ of the redundant binary bit of said partial remainder;

seventh logical means for generating a pair of signals $ls_iL$ and $ls_iH$, one of which indicates a logical AND of the inverted value $e_i^+L$ of the redundant binary bit of said divisor and the inverted value $f_i^-L$ of the redundant binary bit of said partial remainder, and the other of which indicates an inverted value of said logical AND of the inverted values $e_i^+L$ and $f_i^-L$;

fourth gate means for generating signals $ls_{i-1}L$ and $ls_{i-1}H$ fed from the ninth logical means of the previous stage without change or with their output positions being exchanged in response to said signals $r_iH$ and $r_iL$ output from said first gate means;

fifth gate means for generating a pair of signals $\beta s_iH$ and $\beta s_iL$ which are complementary to each other from an output of said eighth logical means and the signals $ls_{i-1}L$ and $ls_{i-1}H$ fed from said ninth logical means of the previous stage in response to the signals $r_iH$ and $r_iL$ output from said first gate means, and for supplying the pair of signals $\beta s_iH$ and $\beta s_iL$ to the next stage; and eighth logical means for generating inverted values $hs_i^+L$ and $hs_i^-L$ of a redundant binary bit of a subtraction output, from an output of said fourth gate means and signals $\beta s_{i-1}H$ and $\beta s_{i-1}L$ fed from said fifth gate means of the previous stage.

10. The divider as claimed in claim 9, wherein said third logical means and said eighth logical means of said redundant binary adder and subtractor each generate a pair of signals which are complementary to each other, and wherein said first gate means comprises transmission gates controlled by the output of said first logical means, said transmission gates outputting a pair of signals input thereto with their output positions being exchanged;

said second gate means comprises transmission gates controlled by the output of said first gate means, said transmission gates outputting the signals $la_{i-1}L$ and $la_{i-1}H$ fed from the previous stage with their output positions being exchanged;

said third gate means comprises transmission gates controlled by the output of said first gate means, said transmission gates selecting one of two pairs of signals consisting of a pair of the signals $la_{i-1}L$ and $la_{i-1}H$ fed from the previous stage and a pair of the signals output from said sixth logical means, and supplying a selected pair of signals to the next stage as the signals $\beta a_i H$ and $\beta a_i L$;

said fourth gate means comprises transmission gates controlled by the output of said first gate means, said transmission gates outputting the signals $ls_{i-1}L$ and $ls_{i-1}H$ fed from the previous stage with their output positions being exchanged; and said fifth gate means comprises transmission gates controlled by the output of said first gate means, said transmission gates selecting one of two pairs of signals consisting of a pair of the signals $ls_{i-1}L$ and $ls_{i-1}H$ fed from the previous stage and a pair of signals output from said sixth logical means, and supplying a selected pair of signals to the next stage as the signals $\beta s_i H$ and $\beta s_i L$.

11. A divider comprising:

a quotient decision circuit for making a sign decision of a quotient bit from upper three bits of a (j−1)-th partial remainder represented by a redundant binary number, said redundant binary number representing its −1 by (0, 1), 0 by (0, 0) and 1 by (1, 0);

a redundant binary adder with a function of switching operation modes in response to a decision result of said quotient decision circuit, said operation modes including an addition mode in which said divisor represented in the redundant binary number is added to said (j−1)-th partial remainder represented in the redundant binary number, and a subtraction mode in which said divisor represented in the redundant binary number is subtracted from said (j−1)-th partial remainder represented in the redundant binary number; and a selector for selecting, in response to the decision result of said quotient decision circuit, one of an output of said redundant binary adder with the function of switching the operation modes, and said (j−1)-th partial remainder, and for outputting a selected signal as a j-th partial remainder represented by said redundant binary number.

12. The divider as claimed in claim 11, wherein said redundant binary adder with the function of switching the operation modes comprises:

a redundant binary adder for adding said divisor represented in the redundant binary number to said (j−1)-th partial remainder represented in the redundant binary number; and a signal path exchanger for exchanging, in response to a decision result of said quotient decision circuit, positions of one of two bit pairs consisting of a bit pair of said divisor and a bit pair of said (j−1)-th partial remainder, when the two bit pairs are input to said redundant binary adder.

13. The divider as claimed in claim 11, wherein said redundant binary adder with the function of switching the operation mode comprises:

first logical means for generating a pair of signals, one of which indicates a logical AND of inverted values $e_i^+L$ and $e_i^-L$ of a redundant binary bit of said divisor, and the other of which indicates an inverted value of said logical AND of the inverted values $e_i^+L$ and $e_i^-L$;

second logical means for generating a pair of signals, one of which indicates a logical AND of inverted values $f_i^+L$ and $f_i^-L$ of a redundant binary bit of said partial remainder, and the other of which indicates an inverted value of said logical AND of the inverted values $f_i^+L$ and $f_i^-L$, where i is a natural number representing a position of the redundant binary bit, and L represents an inverted value;

third logical means for generating a signal $ka_i L$ based on the inverted value $e_i^+L$ of the redundant binary bit of the divisor and the inverted value $f_i^-L$ of the redundant binary bit of the partial remainder;

fourth logical means for generating a signal $la_i L$ based on the inverted value $e_i^-L$ of the redundant binary bit of the divisor and the inverted value $f_i^-L$ of the redundant binary bit of the partial remainder;

fifth logical means for generating a signal $ks_i L$ based on the inverted value $e_i^-L$ of the redundant binary bit of the divisor and the inverted value $f_i^+L$ of the redundant binary bit of the partial remainder;

sixth logical means for generating a signal $ls_i L$ based on the inverted value $e_i^+L$ of the redundant binary bit of the divisor and the inverted value $f_i^-L$ of the redundant binary bit of the partial remainder;

signal path selecting means for selecting one of said signals $ka_i L$ and $ks_i L$ and one of said signals $la_i L$ and $ls_i L$ in response to a control signal, to generate a signal $k_i L$ and a signal $l_i L$, and to send said signal $l_i L$ to a next stage;

logic inverting means for inverting said signal $l_i L$ to generate a signal $l_i H$, and to send said signal $l_i H$ to the next stage;

first gate means for generating a signal $r_i H$ and its complementary signal $r_i L$ from an output of said second logical means in response to an output of said first logical means;

second gate means for generating signals $l_{i-1}L$ and $l_{i-1}H$, which are fed from said signal path selecting means of a previous stage and from said logic inverting means of the previous stage, without change or with their positions being exchanged in response to said signals $r_i H$ and $r_i L$ output from said first gate means;

third gate means for generating a pair of signals $\beta_i H$ and $\beta_i L$ which are complementary to each other from one of the signal $k_i L$ fed from said signal path selecting means and the signals $l_{i-1}L$ and $l_{i-1}H$ which are fed from said signal path selecting means of a previous stage and from said logic inverting means of the previous stage, in response to the signals $r_i H$ and $r_i L$ output from said first gate means, and for supplying the pair of signals $\beta_i H$ and $\beta_i L$ to a next stage; and seventh logical means for generating inverted values $h_i^-L$ and $h_i^-L$ of a redundant binary bit of an addition output of said redundant binary adder with the function of switching the operation modes from an output of said second gate means and signals $\beta_{i-1}H$ and $\beta_{i-1}L$ fed from said third gate means of the previous stage.

* * * * *